United States Patent
Oh et al.

(10) Patent No.: US 10,097,977 B2
(45) Date of Patent: Oct. 9, 2018

(54) COMMUNICATION METHOD FOR ELECTRONIC DEVICE IN WIRELESS COMMUNICATION NETWORK AND SYSTEM THEREFOR

(71) Applicant: Samsung Electronics Co., Ltd., Suwon-si, Gyeonggi-do (KR)

(72) Inventors: Gyu-Bong Oh, Suwon-si (KR); Kyung-Tak Lee, Yongin-si (KR); Do-Hyung Kim, Suwon-si (KR); Jongsoo Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 214 days.

(21) Appl. No.: 14/516,984

(22) Filed: Oct. 17, 2014

(65) Prior Publication Data

US 2015/0113062 A1    Apr. 23, 2015

Related U.S. Application Data

(60) Provisional application No. 61/892,531, filed on Oct. 18, 2013.

(51) Int. Cl.
| | |
|---|---|
| *H04W 4/70* | (2018.01) |
| *H04M 7/00* | (2006.01) |
| *H04W 4/16* | (2009.01) |
| *H04L 29/06* | (2006.01) |
| *H04L 29/08* | (2006.01) |
| *H04W 4/21* | (2018.01) |

(52) U.S. Cl.
CPC ........... *H04W 4/70* (2018.02); *H04L 65/1069* (2013.01); *H04L 67/141* (2013.01); *H04M 7/0036* (2013.01); *H04W 4/16* (2013.01); *H04L 67/10* (2013.01); *H04W 4/21* (2018.02)

(58) Field of Classification Search
CPC ................................ H04W 4/005; H04W 4/70
USPC .......................................... 709/204; 455/466
See application file for complete search history.

(56) References Cited

U.S. PATENT DOCUMENTS

| | | | | |
|---|---|---|---|---|
| 5,875,240 A | * | 2/1999 | Silverman | H04M 3/46 379/133 |
| 5,915,214 A | * | 6/1999 | Reece | H04M 15/49 379/114.01 |
| 5,946,386 A | * | 8/1999 | Rogers | H04L 29/06 379/265.09 |

(Continued)

FOREIGN PATENT DOCUMENTS

| | | |
|---|---|---|
| WO | 2012/175995 A1 | 12/2012 |
| WO | WO 2012175995 A1 * | 12/2012 ........ H04M 3/42102 |

OTHER PUBLICATIONS

Aptilo, "What is WiFi Calling?", 2016.*

(Continued)

*Primary Examiner* — O. C. Vostal
(74) *Attorney, Agent, or Firm* — Jefferson IP Law, LLP

(57) ABSTRACT

A method, an apparatus, and a non-transitory computer-readable storage medium are provided. The method includes initiating communication at an electronic device, providing first information associated with the communication, and providing second information associated with the communication, the second information being provided in a mode that is different from a mode in which the first information is provided.

12 Claims, 36 Drawing Sheets

(56) References Cited

U.S. PATENT DOCUMENTS

| | | | | |
|---|---|---|---|---|
| 6,298,372 B1* | 10/2001 | Yoshikawa | ........ | G06F 17/30899 370/252 |
| 6,501,956 B1* | 12/2002 | Weeren | .................. | H04L 29/06 455/414.2 |
| 6,665,375 B1* | 12/2003 | Forlenza | ................. | H04L 12/66 379/52 |
| 7,617,457 B2* | 11/2009 | Kortum | ................. | G06Q 10/10 370/260 |
| 7,813,723 B2* | 10/2010 | Bredikhin | ......... | G06F 17/30864 379/218.01 |
| 8,116,723 B2* | 2/2012 | Kaltsukis | .............. | G08B 25/08 455/403 |
| 8,200,847 B2* | 6/2012 | LeBeau | ................ | G01C 21/265 701/300 |
| 8,204,197 B2* | 6/2012 | Yap | ........................ | H04M 3/56 370/261 |
| 8,223,929 B2* | 7/2012 | Sylvain | ................ | H04M 3/493 370/352 |
| 8,396,468 B1* | 3/2013 | Krinsky | ................ | H04W 24/00 455/421 |
| 8,675,643 B2* | 3/2014 | Ishibashi | ............. | H04M 1/2535 370/260 |
| 8,856,356 B2* | 10/2014 | Zitnik | .................... | H04L 69/08 370/229 |
| 9,032,027 B2* | 5/2015 | Dudley | .............. | G06Q 30/0261 709/204 |
| 2002/0009071 A1* | 1/2002 | Yaary | .................. | H04M 1/2478 370/352 |
| 2003/0046354 A1* | 3/2003 | Mizuno | .................. | H04L 51/24 709/206 |
| 2004/0125933 A1* | 7/2004 | Jun | ........................ | H04M 3/56 379/202.01 |
| 2005/0026636 A1* | 2/2005 | Yoon | ....................... | H04L 29/06 455/466 |
| 2008/0146256 A1* | 6/2008 | Hawkins | ........... | H04M 1/72522 455/466 |
| 2009/0323912 A1* | 12/2009 | Toner | ................ | H04M 3/42068 379/93.23 |
| 2010/0150332 A1* | 6/2010 | Soo | ................... | H04M 3/42017 379/207.02 |
| 2010/0315480 A1* | 12/2010 | Kahn | .................... | H04L 67/306 348/14.04 |
| 2011/0009096 A1* | 1/2011 | Rotsztein | ............ | H04M 3/5191 455/412.1 |
| 2011/0078767 A1* | 3/2011 | Cai | ..................... | G06F 21/6218 726/4 |
| 2011/0110511 A1* | 5/2011 | Vendrow | ................. | H04L 12/66 379/201.04 |
| 2011/0213681 A1* | 9/2011 | Shahid | .................. | G06Q 30/02 705/27.1 |
| 2011/0249081 A1* | 10/2011 | Kay | .................... | H04M 3/5315 348/14.03 |
| 2011/0279640 A1* | 11/2011 | Choi | ...................... | H04N 7/148 348/14.12 |
| 2011/0287748 A1* | 11/2011 | Angel | ................. | H04M 3/42221 455/414.1 |
| 2012/0023087 A1* | 1/2012 | LeBeau | ............ | H04M 1/72533 707/706 |
| 2012/0066736 A1* | 3/2012 | Labrador | ................ | H04M 3/56 726/1 |
| 2012/0124177 A1* | 5/2012 | Sparks | ................. | G06Q 20/123 709/219 |
| 2012/0170572 A1* | 7/2012 | Bareli | ................. | H04W 76/022 370/352 |
| 2012/0225652 A1* | 9/2012 | Martinez | ........... | H04M 3/42374 455/435.1 |
| 2012/0239761 A1* | 9/2012 | Linner | ................ | G06F 17/2765 709/206 |
| 2013/0210399 A1* | 8/2013 | Cloutier | ............ | H04M 3/42042 455/415 |
| 2013/0244627 A1* | 9/2013 | Kang | ...................... | H04W 4/16 455/414.1 |
| 2013/0275538 A1 | 10/2013 | Shaw | | |
| 2013/0301529 A1* | 11/2013 | Lindsay | .................. | H04W 4/12 370/328 |
| 2013/0303133 A1* | 11/2013 | Sansalone | ......... | H04M 1/72519 455/414.1 |
| 2013/0331073 A1* | 12/2013 | Balan | ...................... | H04W 4/16 455/415 |
| 2014/0003599 A1* | 1/2014 | Kim | .................... | H04M 3/5191 379/265.09 |
| 2014/0120981 A1* | 5/2014 | King | ................. | G06F 17/30265 455/556.1 |
| 2014/0185521 A1* | 7/2014 | Aksu | ...................... | H04W 8/02 370/328 |
| 2014/0211788 A1* | 7/2014 | Garcia | ................ | H04M 7/0057 370/352 |
| 2014/0270128 A1* | 9/2014 | Suito | ....................... | H04M 3/51 379/201.02 |
| 2014/0270129 A1* | 9/2014 | Bracken | ................ | H04L 65/403 379/202.01 |
| 2014/0379931 A1* | 12/2014 | Gaviria | ............... | H04L 65/1016 709/227 |
| 2015/0039773 A1* | 2/2015 | Runeson | ................ | H04L 65/105 709/227 |
| 2015/0066641 A1* | 3/2015 | Dudley | .............. | G06Q 30/0261 705/14.51 |
| 2015/0095499 A1* | 4/2015 | Noldus | ............... | H04L 61/1511 709/226 |
| 2015/0207825 A1* | 7/2015 | Jung | ...................... | H04L 69/04 348/14.08 |
| 2015/0358795 A1* | 12/2015 | You | ......................... | H04L 51/20 455/404.2 |
| 2016/0219392 A1* | 7/2016 | Vilermo | .................. | H04R 5/02 |

OTHER PUBLICATIONS

Gillott, "Ananlyst Angle: Voice over Wi-Fi and the potential impact on VoLTE", 2014.*
Meeker, "What does Meeker's Internet Trends report tell us about voice search?", 2016.*
Wang, "Voice Communications over Zigbee Networks", 2008.*
Wikipedia, "Rich Communication Services", 2018.*
Wikipedia, "Social networking service", 2018.*

* cited by examiner

| Section | Description |
|---|---|
| Feature Number | |
| Feature Title | Feature Title |
| Feature Description | Feature Description<br><br>The Enhanced Visual Call (EVC) feature proposes to enrich the address book and voice call experience of the RCS user with interactive visual call experience.<br>Currently, RCS users have limited information about their communication contacts (e.g. friends, businesses), before or during calls:<br>• Address book information: only if the contact is in his/her personal address book, and limited to what the RCS user stores<br>• Capability information exchange: only applicable if the contact is also an RCS user<br>• Social Presence: only applicable if the contact is also an RCS user, and only if Presence is supported<br><br>To complement the above, the proposal is to provide the RCS user with relevant rich contact information, prior to or during voice dialling to a contact, regardless of whether<br>• the contact is an RCS user or not an RCS user<br>• the contact is a friend or a business (e.g. restaurants, insurance companies) |
| Feature User Stories | Three different use cases are provided in the following slides<br>1. One-Click Menu<br>2. Visual Call Centre<br>3. SNS on Call |
| Feature Customer Impact | RCS users:<br>- Less user interactions required by getting relevant information from the network address book without having to additionally web-search for it<br>- Richer user experience and convenience by coupling RCS voice calling with relevant visual information<br>- Consistent and wider user experience across RCS users, non-RCS users and businesses<br>- Minimum learning curve expected since users are already familiar with web interface<br><br>RCS service providers:<br>- New business opportunities by expanding applicability of RCS to consumer-to-business communication<br>- Increased usage of RCS services due to its wider applicability (not limited to RCS contacts)<br>- Maximizing Use of Yellow Page/White Page which is the unique and invaluable assets of the service providers |

FIG.3A

Enhanced Visual Voice Mail - Summary

| Section | Description |
|---|---|
| Feature Number | |
| Feature Title | Enhanced Visual Voice Mail |
| Feature Description | The Enhanced Visual Voice Mail (EVVM) feature proposes visual interface to voice mail service rather than traditional Interactive Voice Response (IVR) approach.<br><br>Currently, voice mail service is independent of RCS. OMA has developed EVVM enabler for deploying standardized voice mail service.<br><br>The proposal here is to provide the RCS user an integrated access to voice mail service from within RCS service. |
| Feature User Stories | Different use cases are provided in the following slides<br>1. Enhanced Visual Voice Mail<br>2. Greetings Enhancements<br>3. Interworking (forward VMs via SMS/MMS/email) |
| Feature Customer Impact | RCS users:<br>- will be presented with a wider spectrum of VM UI features from which to choose from<br>- will be presented with more converged VM service portfolio offering multiple means of presentation (e.g., email, audio), wider choice of caller languages, more secure and simpler user interface<br>- will offer a wider range of VVM features and possibly some new chargeable events<br>- scope for operators to differentiate their products |

FIG.4A

Enhanced Visual Voice Mail - Feature Description

| Feature Description | Features: |
|---|---|
| | · Voice Mail (VM) Management (e.g., submit, retrieve, delete, forwarding without download, multimedia attachment to VM, background media, future delivery, call back number, emotion indication, spam reporting) |
| | · Greetings Management (e.g., create, delete, modify, based on Time of Day, Caller-ID, language selection, Calendar Date etc, voice to text conversion) |
| | · Notification (new VM, Delivery and Read Reports, SMS and non-SMS notifications) |
| | · Interworking (forward VMs via SMS/MMS/email) |

FIG.4E

Visual Chat - Summary

| Section | Description |
|---|---|
| Feature Number | |
| Feature Title | Visual Chat (VC) |
| Feature Description | Today in RCS one or more users can communicate with each other, however viewing contents such as TV, movies is missing.<br><br>The proposal here is to integrate Content Viewing and Communication experience to enhance RCS features with third party Visual Content as provided by OMA ISC Enabler like<br>• Content Viewing and Communication with other RCS user(s) simultaneously<br>• Synchronizing the Contents with other RCS user(s)<br>• Interaction with the Content (e.g., user recommending a content, sharing interest to watch a content)<br>• Sharing Content Viewing information to other RCS User |
| Feature User Stories | Four different use cases are provided in the following slides<br>1. Integration of Content Viewing and Communication<br>2. Content Recommendation<br>3. Content Synchronization<br>4. Group Content Viewing |
| Feature Customer Impact | RCS users:<br>- Able to enjoy Content integrated with today's RCS communication (available on multiple devices and customized through user preferences)<br>- New and seamless experience extended to the integrated Content watching<br>- Users need not use multiple services for Communication while watching Content<br><br>RCS service providers:<br>- New business opportunities (tie up with Content Providers)<br>- Improves revenue (encourages more service usage)<br>- Leads to increase in subscriber base |

FIG.5A

Visual Chat - Expected Benefits

RCS User

- Able to enjoy Content integrated with today's RCS communication (available on multiple devices and customized through user preferences)
- New and seamless experience extended to the integrated Content watching
- Users need not use multiple services for Communication and watching Content

RCS Service Provider

- New business opportunities (tie up with Content Providers)
- Leads mobile service market with enhanced RCS features
- Improves revenue (encourages more service usage)
- Leads to increase in subscriber base.

FIG.5G

Converged Address Book - Summary

| Section | Description |
|---|---|
| Feature Number | |
| Feature Title | Converged Address Book |
| Feature Description | The Converged Address Book feature proposes to introduce the network address book and enhanced social networking features to the RCS user for improving the user experience and helping lock-in of the RCS User within the MNO's service.<br>Currently, RCS users have limited information on the enhanced address book:<br>· address book information or CAB 1.0 PCC(Personal Contact Card):<br>· Service Capability information: Chat, File Transfer, Geolocation, Video Share, Image Share, IP Video Call,<br>· Social Presence: Availability, Portrait, Free text, Favourite link, Timestamp, Geolocation<br>In order to complement the above, the proposal is to always keep the up-to-date and rich contact information for the RCS user |
| Feature User Stories | Three different use cases are provided in the following slides<br>1. Contact Search<br>2. External Profile import<br>3. Contact Subscription<br>4. Contact Share |
| Feature Customer Impact | RCS users:<br>- Less user interactions required by getting relevant information from the network address book without having to additionally web-search for it<br>- Enriched RCS user's contact information by importing social activity within/without the RCS call<br>- Instant update of the friends or favourite contacts by subscribing the RCS user's PCC (Personal Contact Card)<br>- Secure Contact Sharing by allowing the access of the whole or part of PCC via the link<br>RCS service providers:<br>- Maximizing Use of Yellow Page/White Page which is the unique and invaluable assets of the service providers<br>- New business opportunities by expanding applicability of RCS to consumer-to-business (airlines, dental clinic, grocery etc)<br>- Returning to the Master of content provider (game, online mall, media contents (book/movie/VoD etc)<br>- Enhancement of stickiness for subscribers by Incorporating with social networks |

FIG.6A

Converged Address Book - New Benefits

RCS User

- Less user interactions required by getting relevant information from the network address book without having to additionally web-search for it
- Enriched RCS user's contact information by importing social activity within/without the RCS call
- Instant update of the friends or favourite contacts by subscribing the RCS user's PCC
- Secure Contact Sharing by allowing the access of the whole or part of PCC via the link

RCS Service Provider

- Maximizing Use of Yellow Page/White Page which is the unique and invaluable assets of the service providers
- New business opportunities by expanding applicability of RCS to consumer-to-business (airlines, dental clinic, grocery etc)
- Returning to the Master of content provider (game, online mall, media contents (book/movie/VoD etc)
- Enhancement of stickiness for subscribers by Incorporating with social networks

Individuals / businesses

- Higher exposure of their activities (e.g. personal blogs, menus)
- Rely on RCS for services they cannot afford (e.g. Public Profile for small businesses)
- Standardized service across operators

FIG.6H

COMMUNICATION METHOD FOR ELECTRONIC DEVICE IN WIRELESS COMMUNICATION NETWORK AND SYSTEM THEREFOR

CROSS-REFERENCE TO RELATED APPLICATION(S)

This application claims the benefit under 35 U.S.C. § 119(e) of a U.S. Provisional application filed on Oct. 18, 2013 in the U.S. Patent and Trademark Office and assigned Ser. No. 61/892,531, the entire disclosure of which is hereby incorporated by reference.

TECHNICAL FIELD

The present disclosure relates to communicating using one or more electronic devices in a wireless communication network.

BACKGROUND

Electronic devices such as, for example, smart phones may be used for communicating information such as, for example, a voice call. Users may wish to send and/or receive information more effectively using electronic devices.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to provide at least the advantages described below. Accordingly, an aspect of the present disclosure is to provide a method and an apparatus for initiating communication at an electronic device.

In accordance with an aspect of the present disclosure, a method is provided. The method includes initiating communication at an electronic device, providing, at the electronic device, first information associated with the communication, and providing, at the electronic device, second information associated with the communication, the second information being provided in a mode that is different from a mode in which the first information is provided.

In accordance with another aspect of the present disclosure, an apparatus is provided. The apparatus includes an initiating module configured to initiate communication at an electronic device and a providing module configured to provide first information associated with the communication and to provide second information associated with the communication, the providing module being configured to provide the second information in a mode that is different from a mode in which the first information is provided.

In accordance with another aspect of the present disclosure, a non-transitory computer-readable storage medium storing instructions that when executed by one or more processors cause the one or more processors to execute a method is provided. The method including initiating communication at an electronic device, providing, at the electronic device, first information associated with the communication and providing, at the electronic device, second information associated with the communication, the second information being provided in a mode that is different from a mode in which the first information is provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3A shows features of an enhanced visual call according to an embodiment of the present disclosure;

FIG. 4A shows features of an enhanced visual voice mail according to an embodiment of the present disclosure;

FIG. 4E shows features of use cases of an enhanced visual voice mail according to an embodiment of the present disclosure;

FIG. 5A shows features of a visual chat according to an embodiment of the present disclosure;

FIG. 5G shows expected benefits of a visual chat according to an embodiment of the present disclosure;

FIG. 6A shows features of a converged address book according to an embodiment of the present disclosure;

FIG. 6H shows expected benefits of a converged address book according to an embodiment of the present disclosure;

Throughout the drawings, like reference numerals will be understood to refer to like parts, components, and structures.

DETAILED DESCRIPTION

Figure 1:
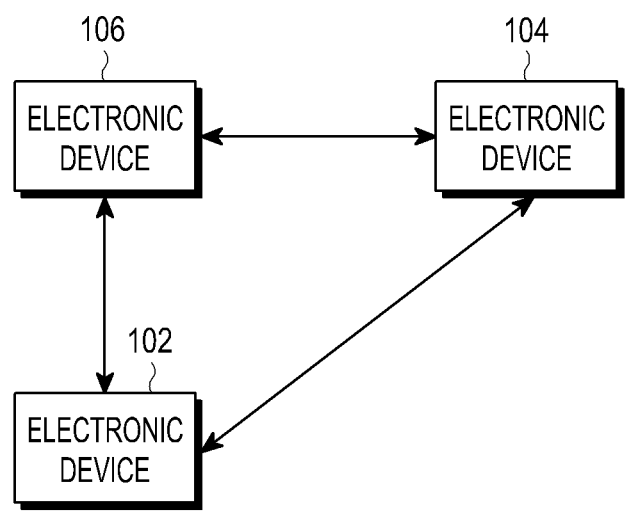
FIG. 1 shows an example communication according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used in the present disclosure, terms such as "includes" or "may include" refer to the presence of the corresponding function, operation or feature, and do not limit the presence of additional functions, operations or features. Also, terms such as "includes" or "has" refers to the presence of characteristics, numbers, steps, operations, components or combinations thereof, and is not intended to exclude one or more additional characteristics, numbers, steps, operations, components or combinations thereof.

As used in the present disclosure, the term "or" is used to include any and all combination of terms listed. For examples, "A or B" includes only A, only B, or both A and B. As used in the present disclosure, terms such as "first" or "second" may be used to describe various features, but do not limit such features. For example, the terms do not limit the order and/or the importance of their associated features. Such terms may be used to differentiate one feature from another. For example, a first user equipment and a second user equipment are both user equipment, but are different user equipment. For example, without departing from the scope of the present disclosure, a first component may be called a second component, and likewise, a second component may be called a first component.

If a component is said to be "connected with" or "connected to" another component, the component may be directly connected with, or connected to, the other component, or another component may exist in between. On the other hand, if a component is said to be "directly connected with" or "directly connected to" another component, it should be understood that no components exist in between.

Terms as used in the present disclosure are used to describe the various embodiments of the present disclosure, and are not intended to limit the present disclosure. Singular terms are intended to include plural forms, unless the context makes it clear that plural forms are not intended.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

An electronic device according to the present disclosure may include communication functionality. For example, an electronic device according to the present disclosure may be a smart phone, tablet personal computer (PC), mobile phone, video phone, e-book reader, desktop PC, laptop PC, netbook PC, personal digital assistant (PDA), portable multimedia player (PMP), mp3 player, mobile medical device, camera, or wearable device (e.g., head-mounted device (HMD), electronic clothes, electronic braces, electronic necklace, electronic appcessory, electronic tattoo, smart glasses or smart watch).

According to various embodiments, an electronic device may be a smart home appliance with communication functionality. A smart home appliance may be, for example, a television, digital video disk (DVD) player, audio, refrigerator, air conditioner, vacuum cleaner, oven, microwave oven, washer, dryer, air purifier, set-top box, TV box (e.g., Samsung HomeSync™, Apple TV™, or Google TV™), gaming console, electronic dictionary, electronic key, camcorder, or electronic picture frame.

According to various embodiments, an electronic device may be a medical device (e.g., magnetic resonance angiography (MRA) device, magnetic resonance imaging (MRI) device, computed tomography (CT) device, imaging device, or ultrasonic device), navigation device, global positioning system (GPS) receiver, event data recorder (EDR), flight data recorder (FDR), automotive infotainment device, naval electronic device (e.g., naval navigation device, gyroscope or compass), avionic electronic device, security device, or industrial or consumer robot.

According to various embodiments, an electronic device may be furniture, part of a building/structure, an electronic board, electronic signature receiving device, projector, or various measuring devices (e.g., water, electricity, gas or electro-magnetic wave measuring devices), that include communication functionality.

An electronic device according to the present disclosure may be any combination of the foregoing devices. In addition, it will be apparent to one having ordinary skill in the art that an electronic device according to the present disclosure is not limited to the foregoing devices.

FIGS. 1 through 9, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

FIG. 1 shows an example of communication according to an embodiment of the present disclosure.

Referring to FIG. 1, an electronic device 102 may initiate communication with an electronic device 104. The communication between the electronic devices 102 and 104 may be initiated, for example, as a voice call. Before, during or after the communication, the electronic device 104 may initiate transmission of information associated with the communication to the electronic device 102, from an electronic device 106. Information transmitted from the electronic device 106 to the electronic device 102 may be, for example, text and/or images that are associated with the communication between the electronic device 102 and the electronic device 106. In an embodiment, information transmission from the electronic device 106 to the electronic device 102 may be initiated by the electronic device 102.

Figure 2:
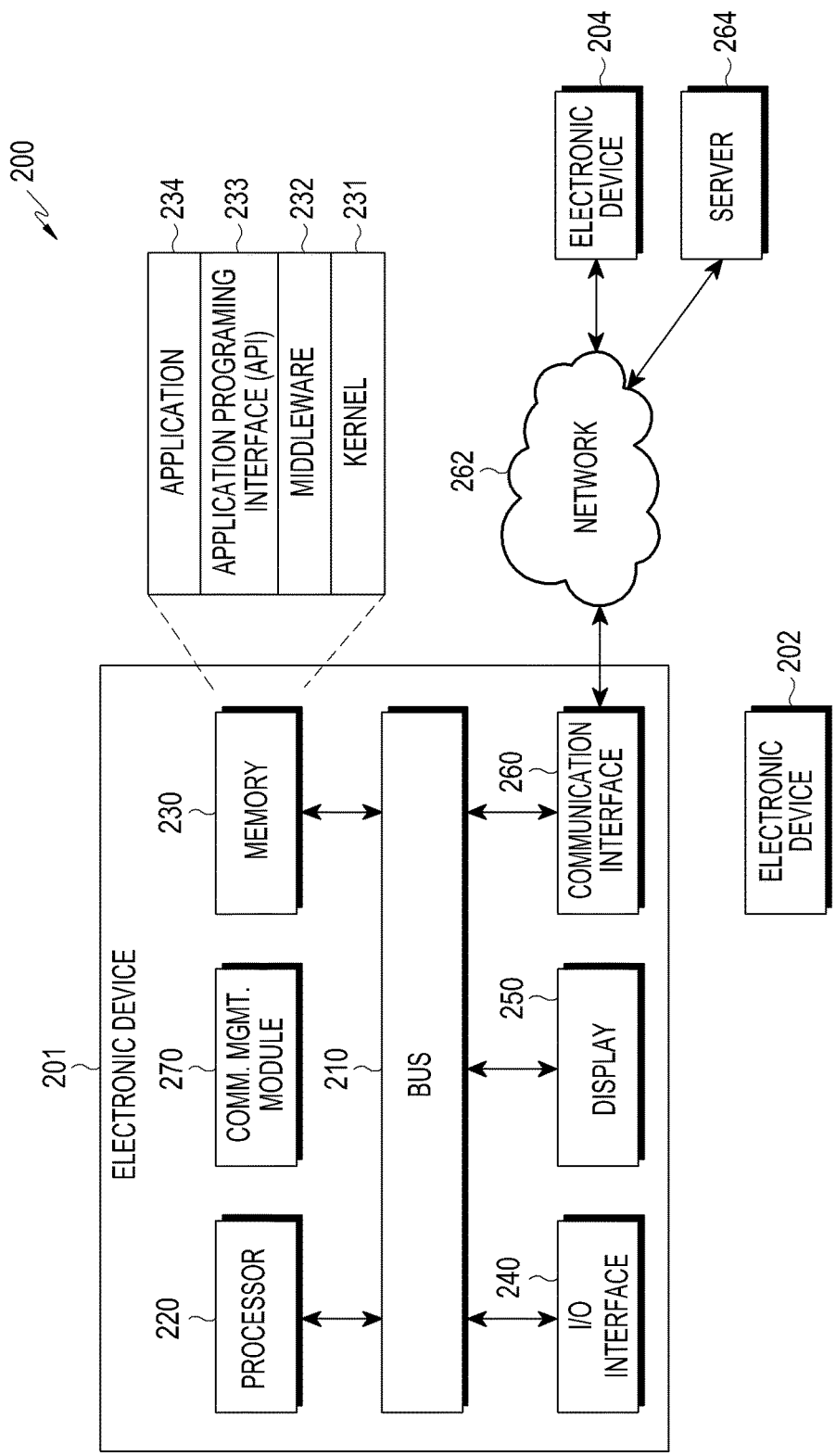
FIG. 2 shows a block diagram of an electronic device according to an embodiment of the present disclosure.

FIG. 2 shows a block diagram of an electronic device according to an embodiment of the present disclosure. The electronic device may be, for example, electronic device 102, 104 or 106 as illustrated in FIG. 1.

Referring to FIG. 2, a communication system 200 may include an electronic device 201, and the electronic device 201 may include at least one of a bus 210, a processor 220, a memory 230, an input/output (I/O) interface 240, a display 250, a communication interface 260 and a communication management module 270.

The bus 210 may be circuitry that connect the foregoing components and allow communication (e.g., send control messages) between the foregoing components.

The processor 220 may, for example, receive instructions from other components (e.g., memory 230, I/O interface 240, display 250 or communication interface 260), interpret the received instructions and execute computation or data processing according to the interpreted instructions.

The memory 230 may, for example, store instructions or data that are received from, or generated by, other components (e.g., memory 230, I/O interface 240, display 250 or communication interface 260). For example, the memory 230 may include programming modules such as a kernel 231, middleware 232, an application programming interface (API) 233 or an application 234. Each of the foregoing programming modules may include at least one of software, firmware, hardware or a combination thereof.

The kernel 231 may control or manage system resources (e.g., bus 210, processor 220 or memory 230) that may be used in executing operations or functions implemented in other programming modules such as, for example, the middleware 232, the API 233 or the application 234. Also, the kernel 231 may provide an interface for allowing the middleware 232, the API 233 or the application 234 to access individual components of the electronic device 201.

The middleware 232 may be a medium through which the kernel 231 may communicate with the API 233 or the application 234 to send and receive data. Also, the middleware 232 may control (e.g., scheduling or load balancing) work requests by one or more applications (e.g., application 234) by, for example, assigning priorities for using system resources (bus 210, processor 220 or memory 230) of the electronic device 201 to the one or more applications (e.g., application 234).

The API 233 is an interface that may control functions that the application 234 may provide at the kernel 231 or the middleware 232. For example, the API 233 may include at least an interface or function (e.g., command) for file control, window control, video processing or character control.

The I/O interface 240, for example, may receive an instruction or data from a user and send, via the bus 210, to the processor 220 or the memory 230. Also, the I/O interface 240 may output audio information received, via the bus 210, from the memory 230 or the communication interface 260.

The display 250 may display an image, video or data to the user.

The communication interface 260 may provide communication between the electronic device 201 and one or more other electronic devices (e.g., electronic device 202, electronic device 204, server 264, etc.). The communication interface 260 may support specified communication protocol (e.g., Wi-Fi, Wi-Fi Direct, WirelessGigabit (WiGig), Bluetooth (BT), Bluetooth Low Energy (BLE), Zigbee, Ultra-wideband (UWB), Near Field Communication (NFC), Radio-Frequency Identification (RFID), Audio Sync, Electric-Field Communication (EFC), Human Body Communication (HBC) or Visible Light Communication (VLC)), or a network communication 262. The network communication 262 may be, for example, Internet, local area network (LAN), wide area network (WAN), telecommunication network, cellular network, satellite network or plain old telephone service (POTS) network.

The communication management module 270 may be configured to, for example, manage at least one of communications between the foregoing components.

FIG. 3A shows features of an enhanced visual call according to an embodiment of the present disclosure.

Figure 3B:
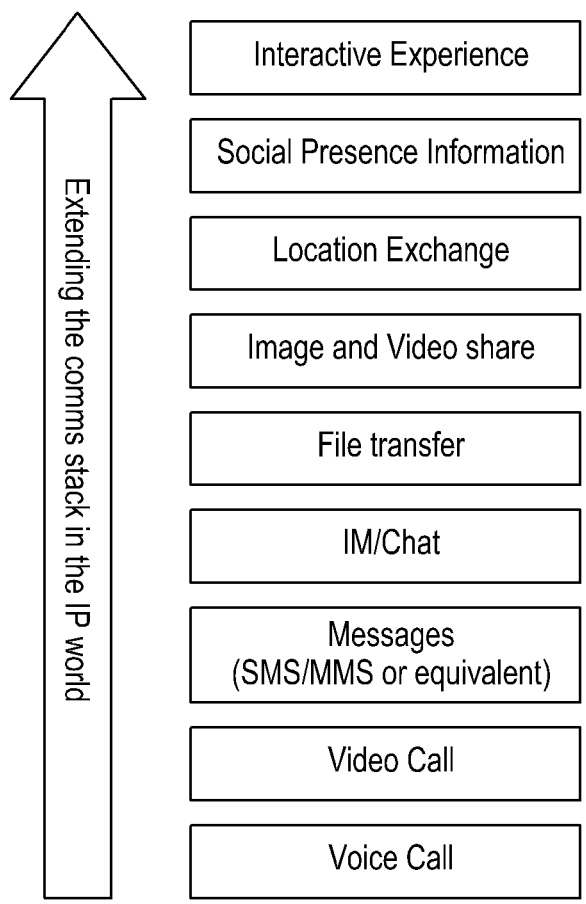
FIG. 3B shows a rich communication service (RCS) industry proposition according to an embodiment of the present disclosure.

FIG. 3B shows a rich communication service (RCS) industry proposition according to an embodiment of the present disclosure.

Figure 3C:
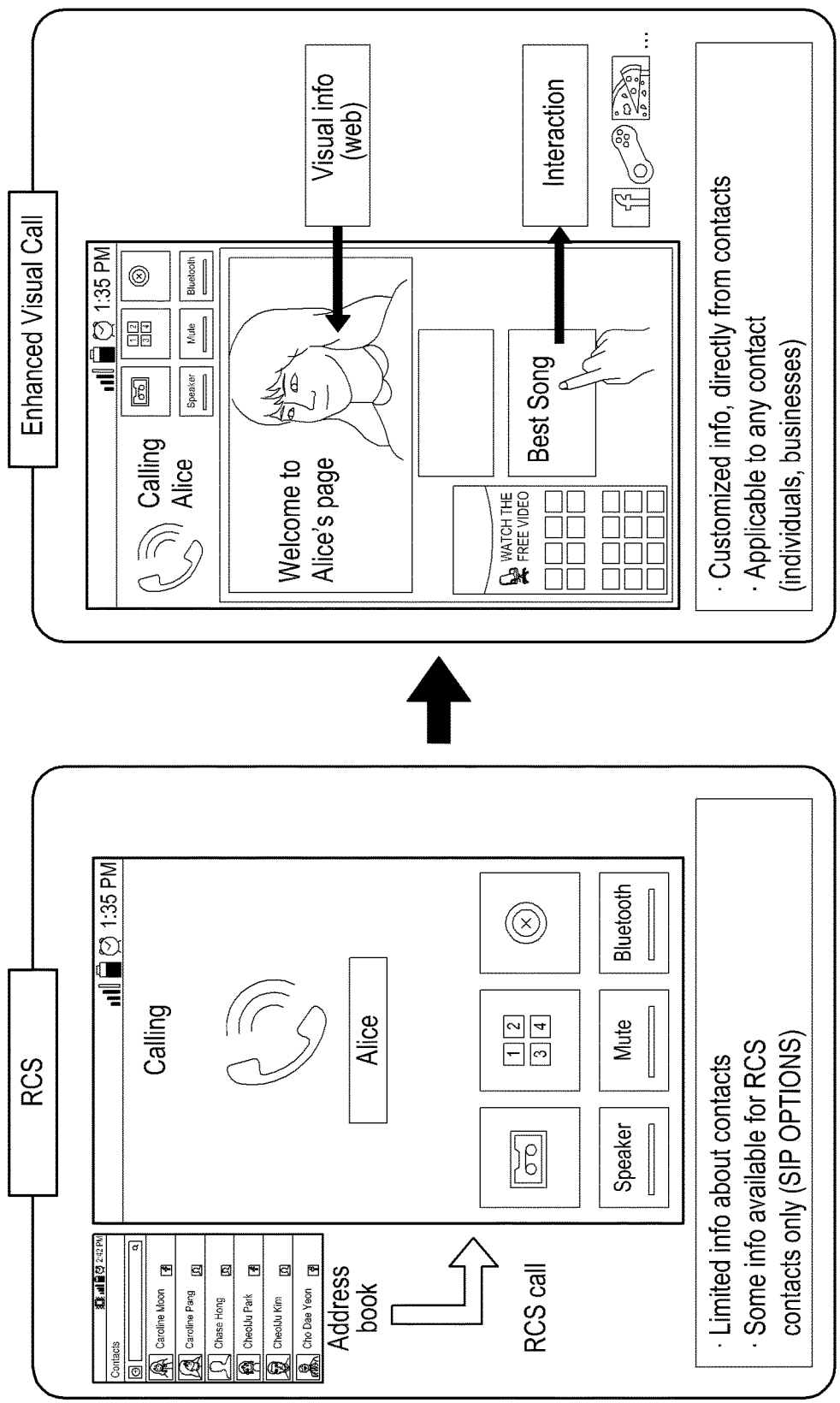
FIG. 3C shows a concept of an enhanced visual call according to an embodiment of the present disclosure.

FIG. 3C shows a concept of an enhanced visual call according to an embodiment of the present disclosure.

Figure 3D:
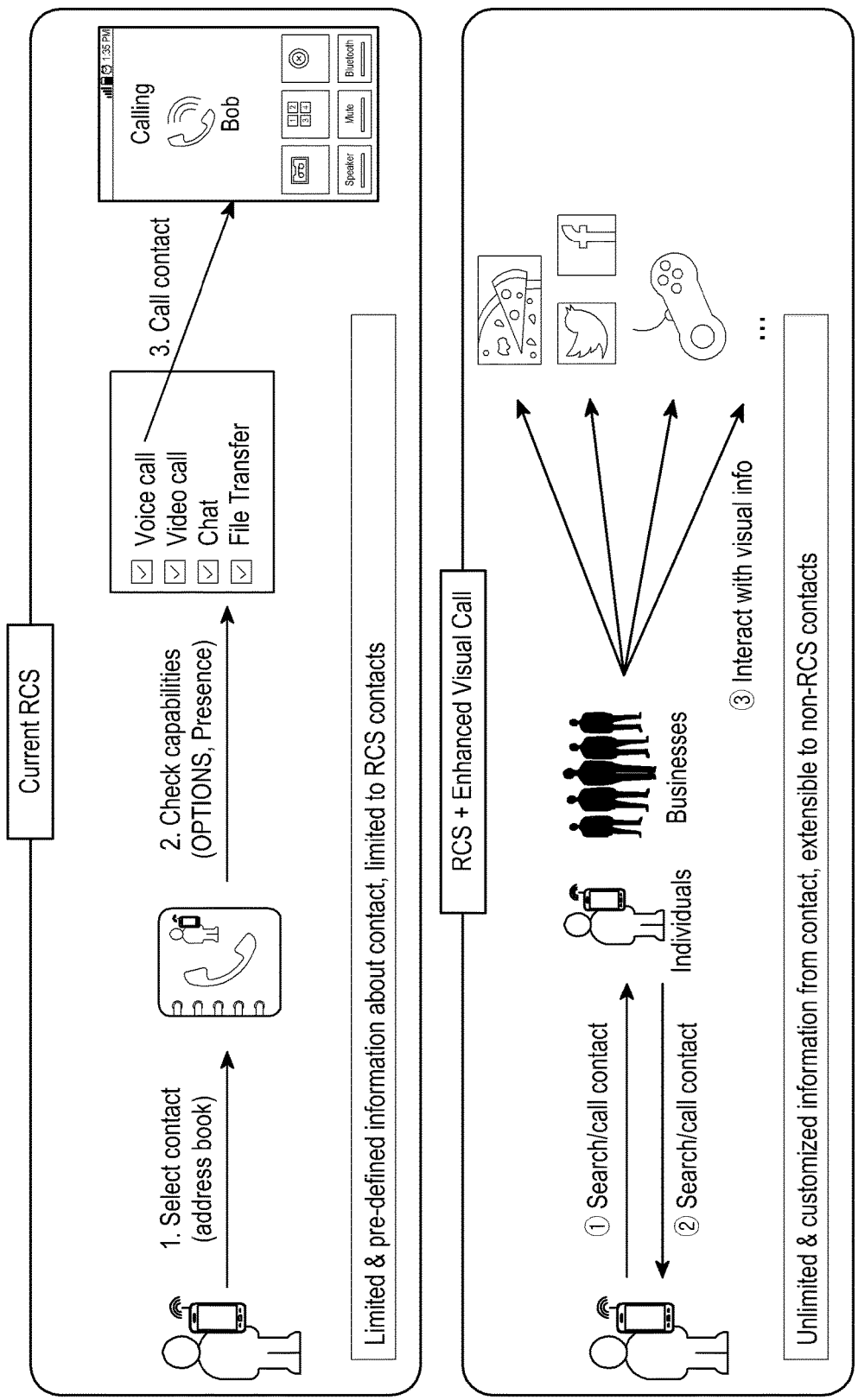
FIG. 3D shows another concept of an enhanced visual call according to an embodiment of the present disclosure.

FIG. 3D shows another concept of an enhanced visual call according to an embodiment of the present disclosure.

Figure 3E:
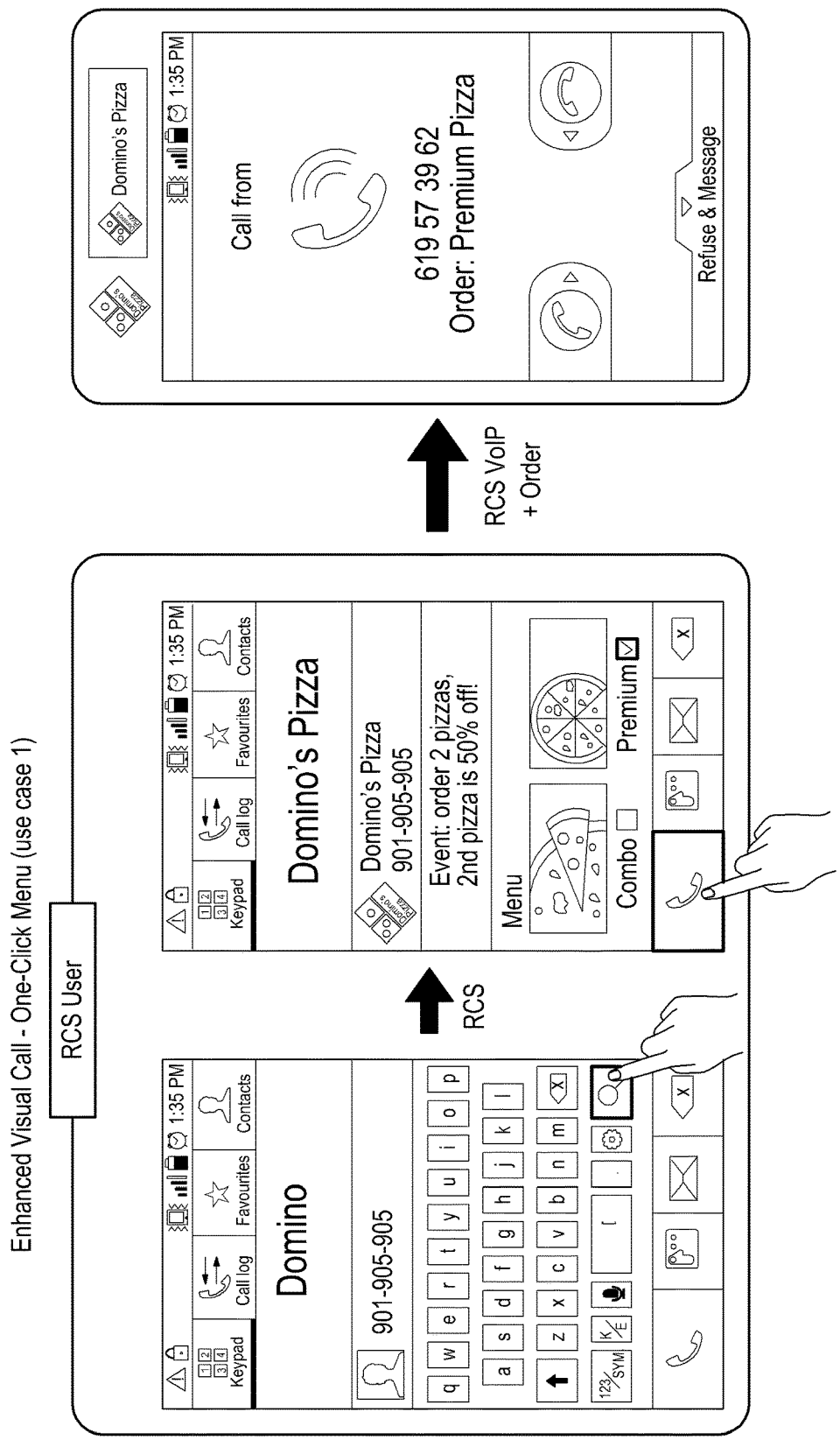
FIG. 3E shows a use case of an enhanced visual call according to an embodiment of the present disclosure.

FIG. 3E shows a use case of an enhanced visual call according to an embodiment of the present disclosure.

Figure 3F:
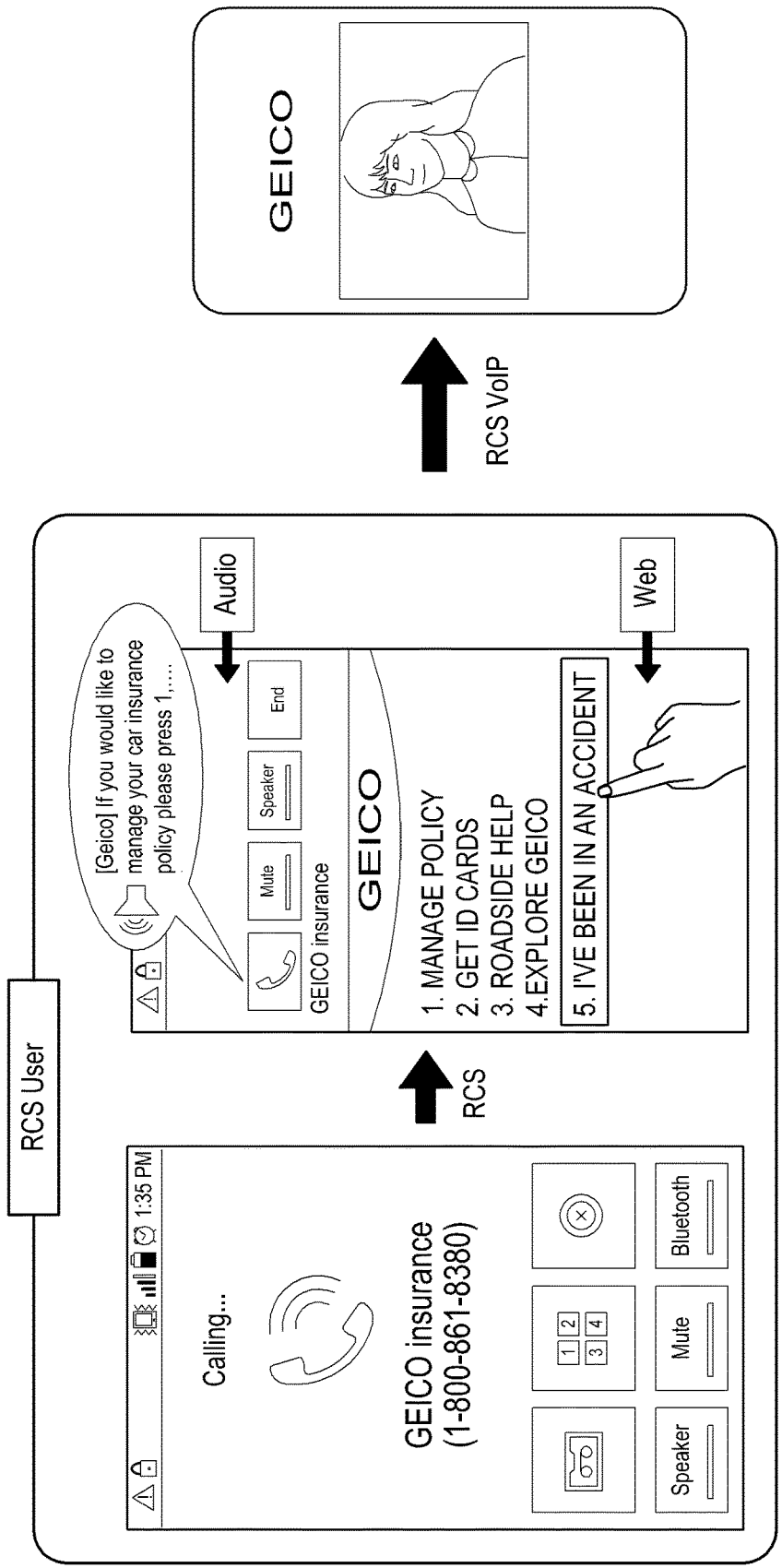
FIG. 3F shows a one-click menu use case of an enhanced visual call according to an embodiment of the present disclosure.

FIG. 3F shows a one-click menu use case of an enhanced visual call according to an embodiment of the present disclosure.

Figure 3G:
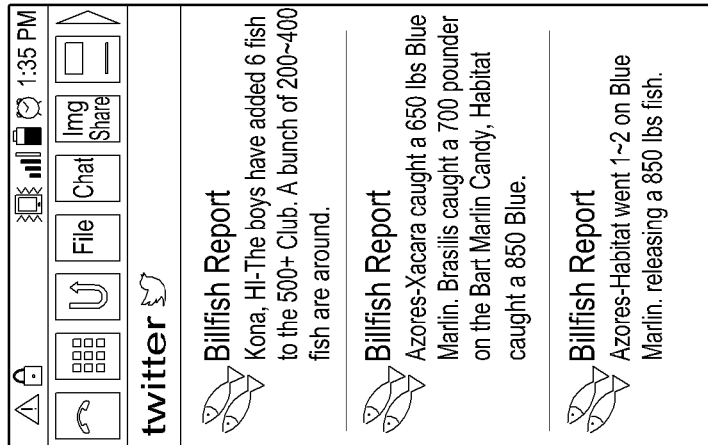
FIG. 3G shows a visual call center use case of an enhanced visual call according to an embodiment of the present disclosure.
Figure 3G:
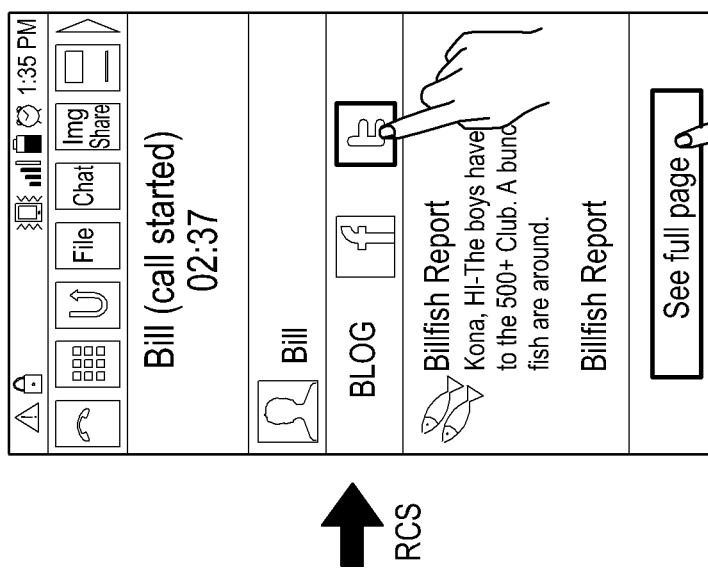
Figure 3G:
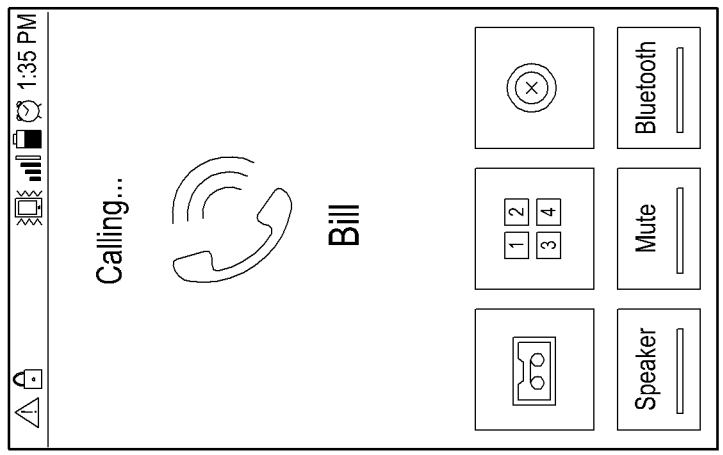

FIG. 3G shows a visual call center use case of an enhanced visual call according to an embodiment of the present disclosure.

Figure 3H:
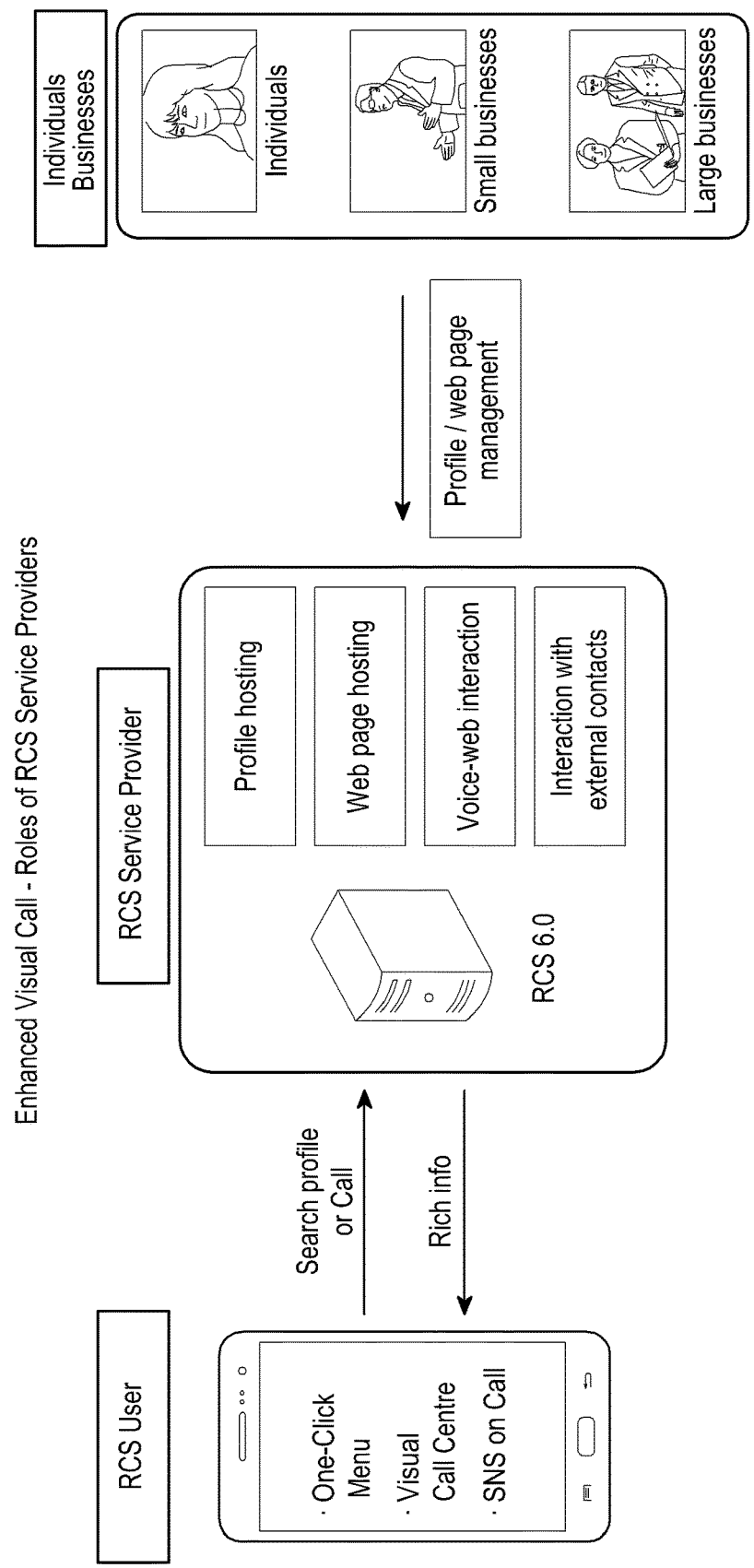
FIG. 3H shows an RCS service provider's role of an enhanced visual call according to an embodiment of the present disclosure.

FIG. 3H shows an RCS service provider's role of an enhanced visual call according to an embodiment of the present disclosure.

Figure 3I:
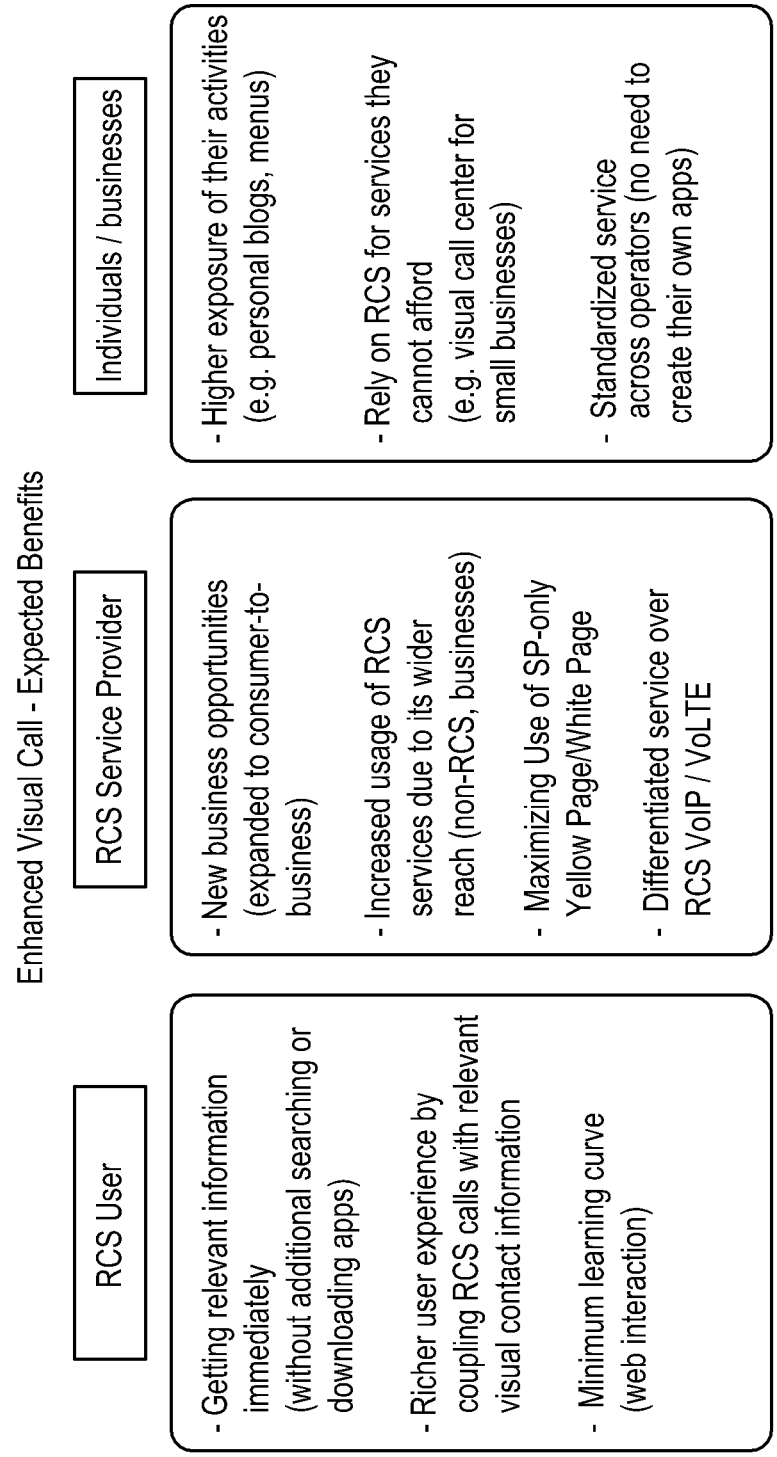
FIG. 3I shows expected benefits of an enhanced visual call according to an embodiment of the present disclosure.

FIG. 3I shows expected benefits of an enhanced visual call according to an embodiment of the present disclosure.

FIG. 4A shows features of an enhanced visual voice mail according to an embodiment of the present disclosure.

Figure 4B:
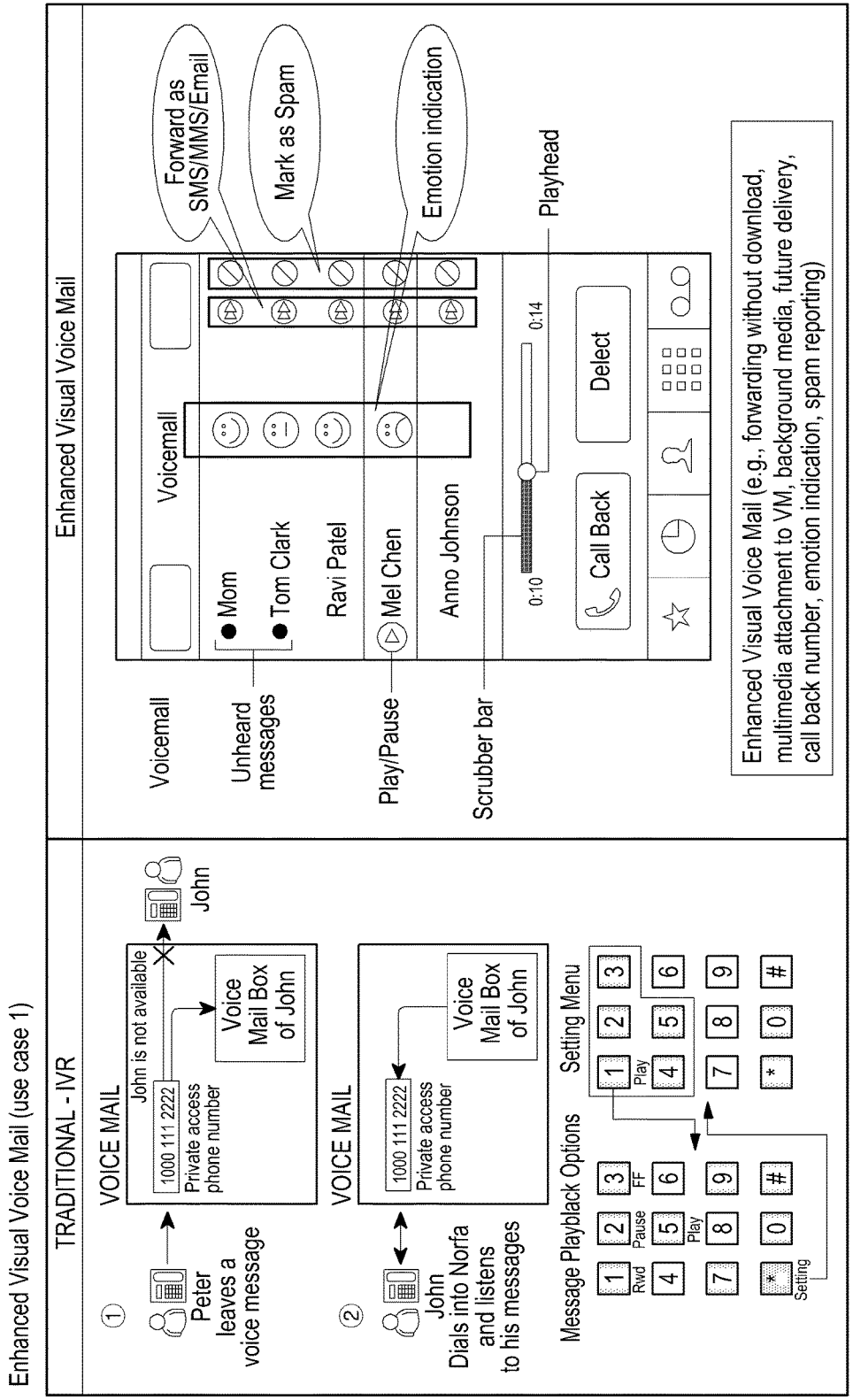
FIG. 4B shows a use case of an enhanced visual voice mail according to an embodiment of the present disclosure.

FIG. 4B shows a use case of an enhanced visual voice mail according to an embodiment of the present disclosure.

Figure 4C:
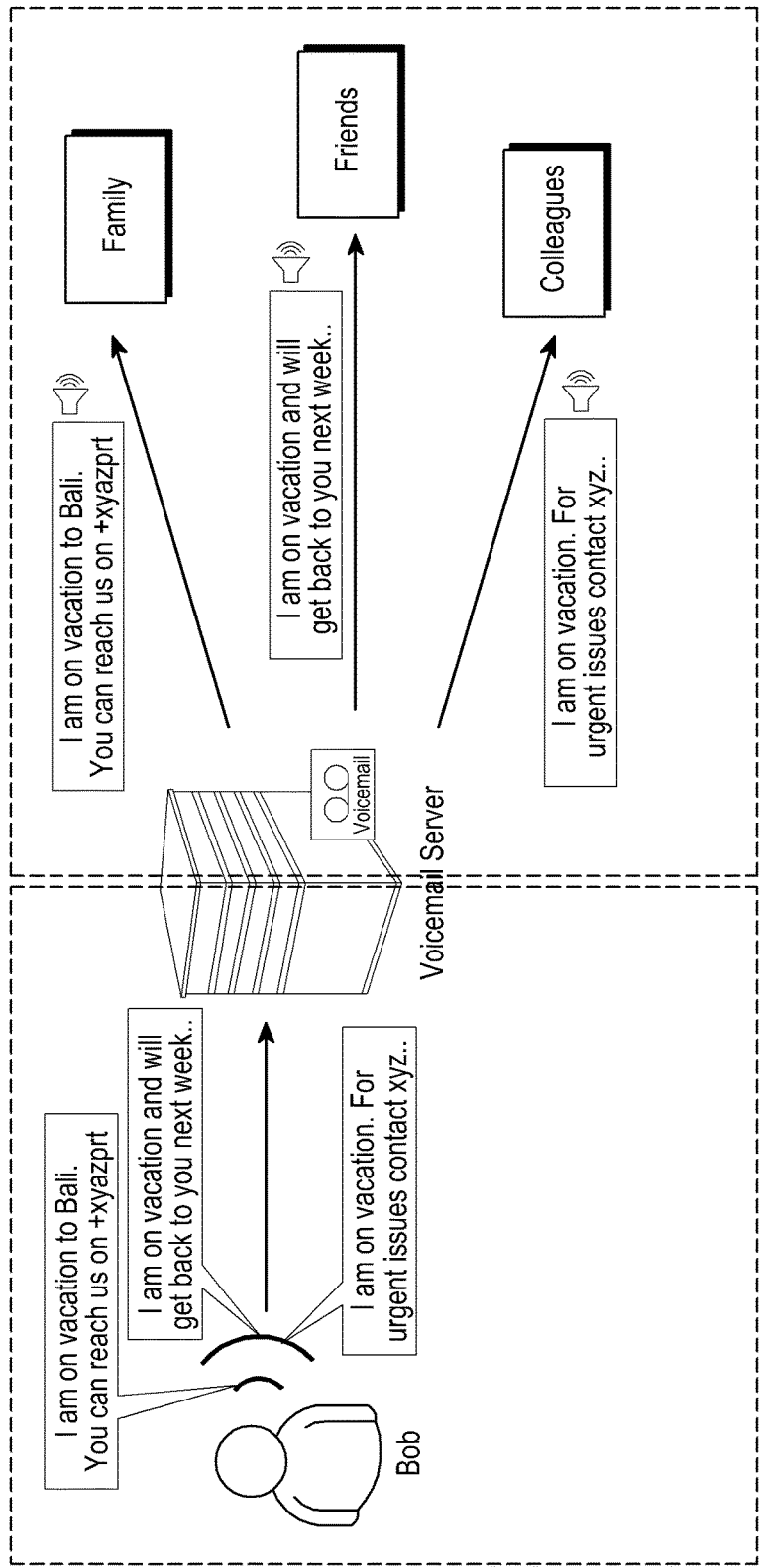
FIG. 4C shows a greetings enhancement use case of an enhanced visual voice mail according to an embodiment of the present disclosure.

FIG. 4C shows a greetings enhancement use case of an enhanced visual voice mail according to an embodiment of the present disclosure.

Figure 4D:
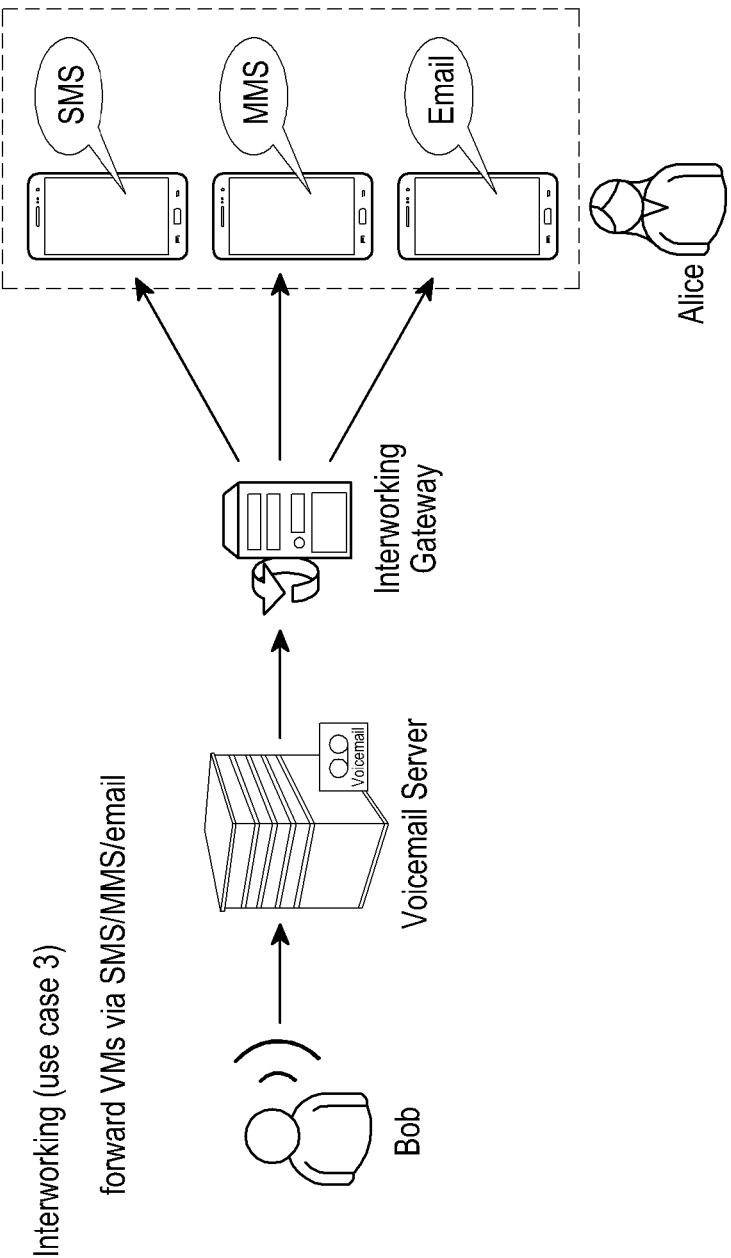
FIG. 4D shows an interworking use case of an enhanced visual voice mail according to an embodiment of the present disclosure.

FIG. 4D shows an interworking use case of an enhanced visual voice mail according to an embodiment of the present disclosure.

FIG. 4E shows features of use cases of an enhanced visual voice mail according to an embodiment of the present disclosure.

FIG. 5A shows features of a visual chat according to an embodiment of the present disclosure.

Figure 5B:
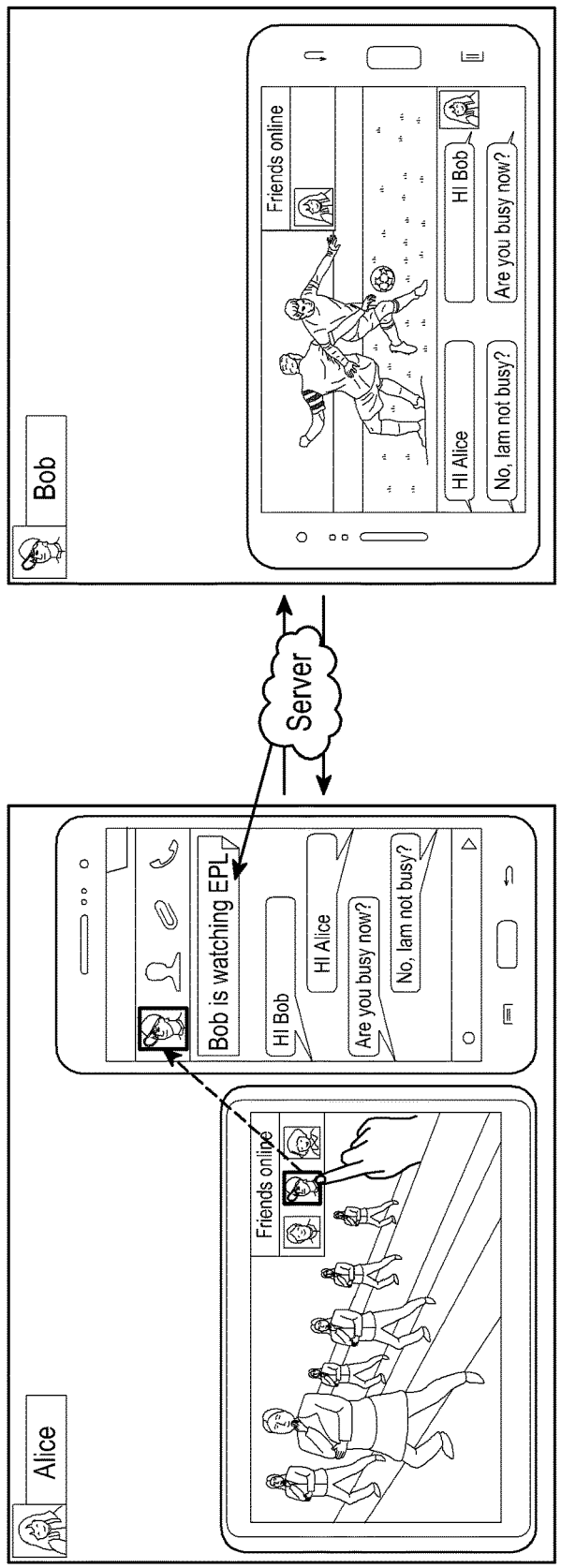
FIG. 5B shows an integration of a content viewing and communication use case of a visual chat according to an embodiment of the present disclosure.

FIG. 5B shows an integration of a content viewing and communication use case of a visual chat according to an embodiment of the present disclosure.

Figure 5C:
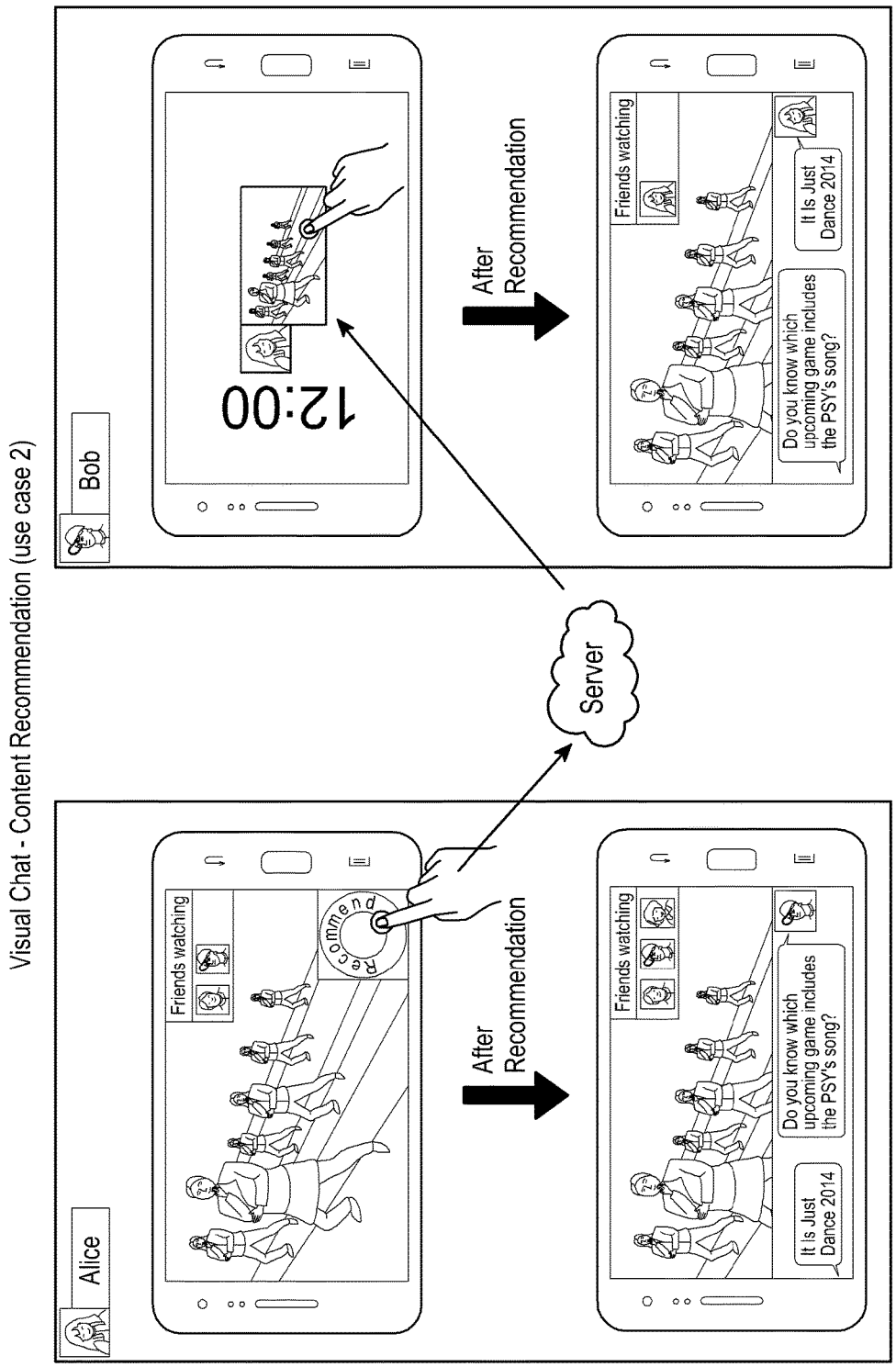
FIG. 5C shows a content recommendation use case of a visual chat according to an embodiment of the present disclosure.

FIG. 5C shows a content recommendation use case of a visual chat according to an embodiment of the present disclosure.

Figure 5D:
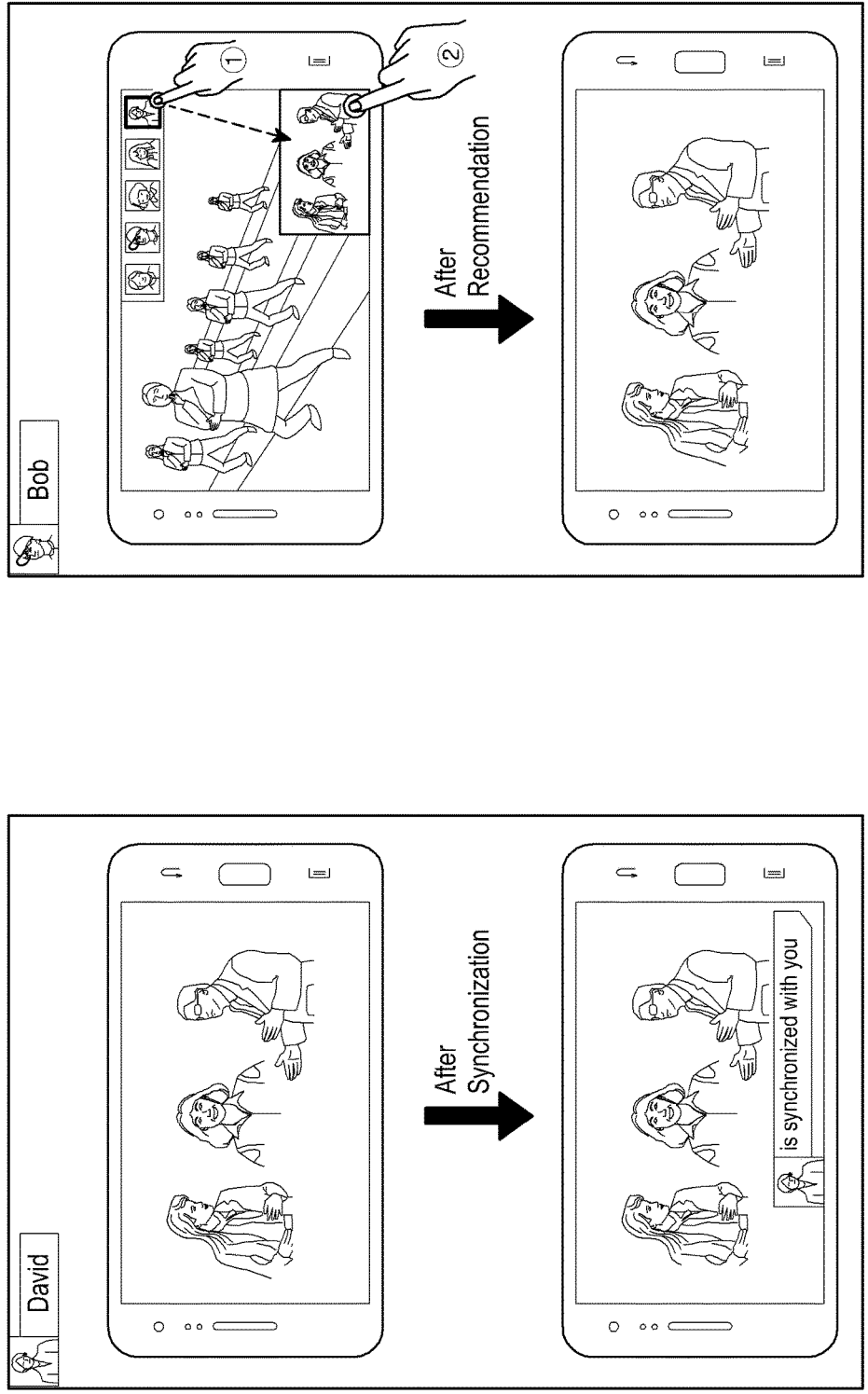
FIG. 5D shows a content synchronization use case of a visual chat according to an embodiment of the present disclosure.

FIG. 5D shows a content synchronization use case of a visual chat according to an embodiment of the present disclosure.

Figure 5E:
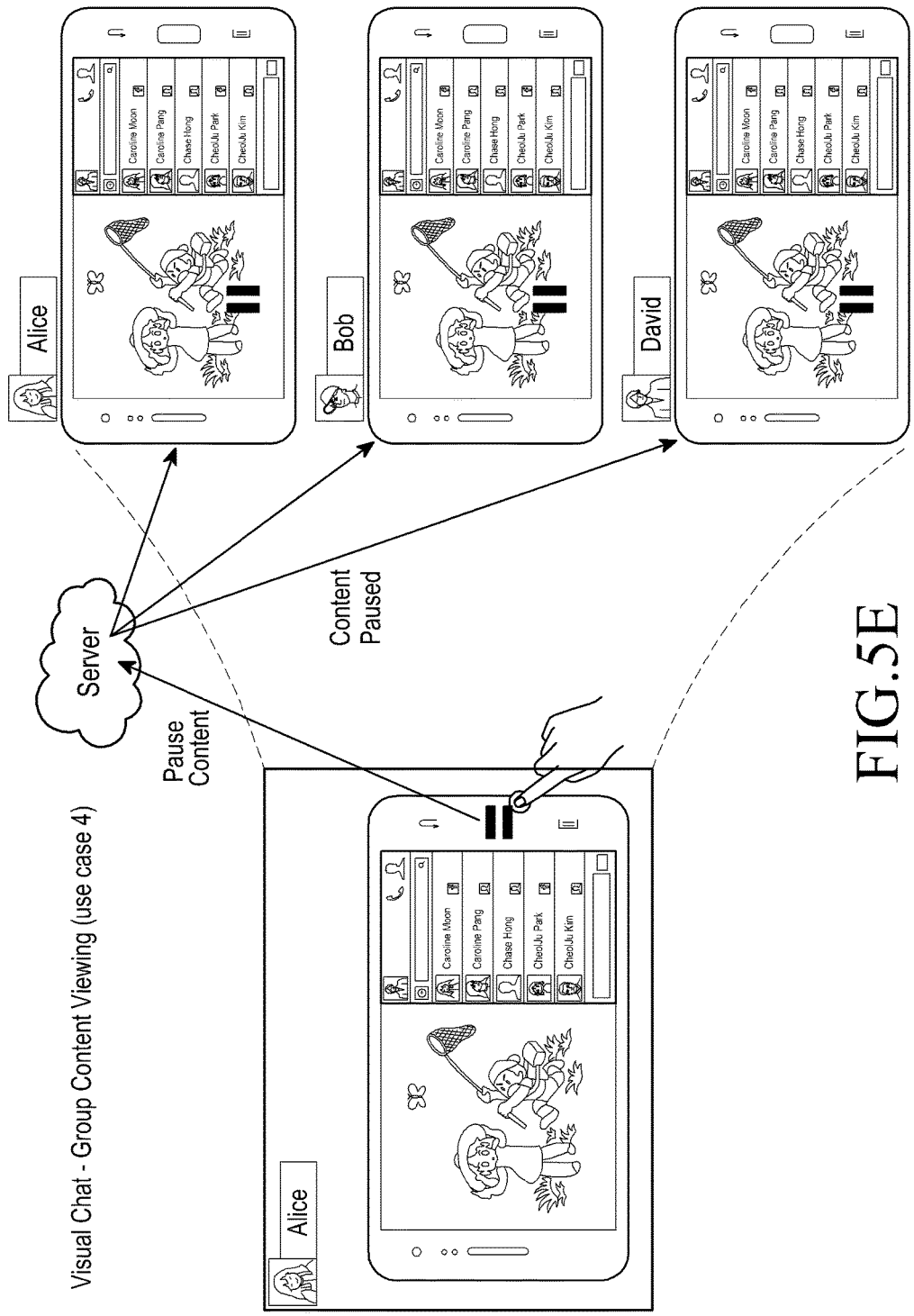
FIG. 5E shows a group content viewing use case of a visual chat according to an embodiment of the present disclosure.

FIG. 5E shows a group content viewing use case of a visual chat according to an embodiment of the present disclosure.

Figure 5F:
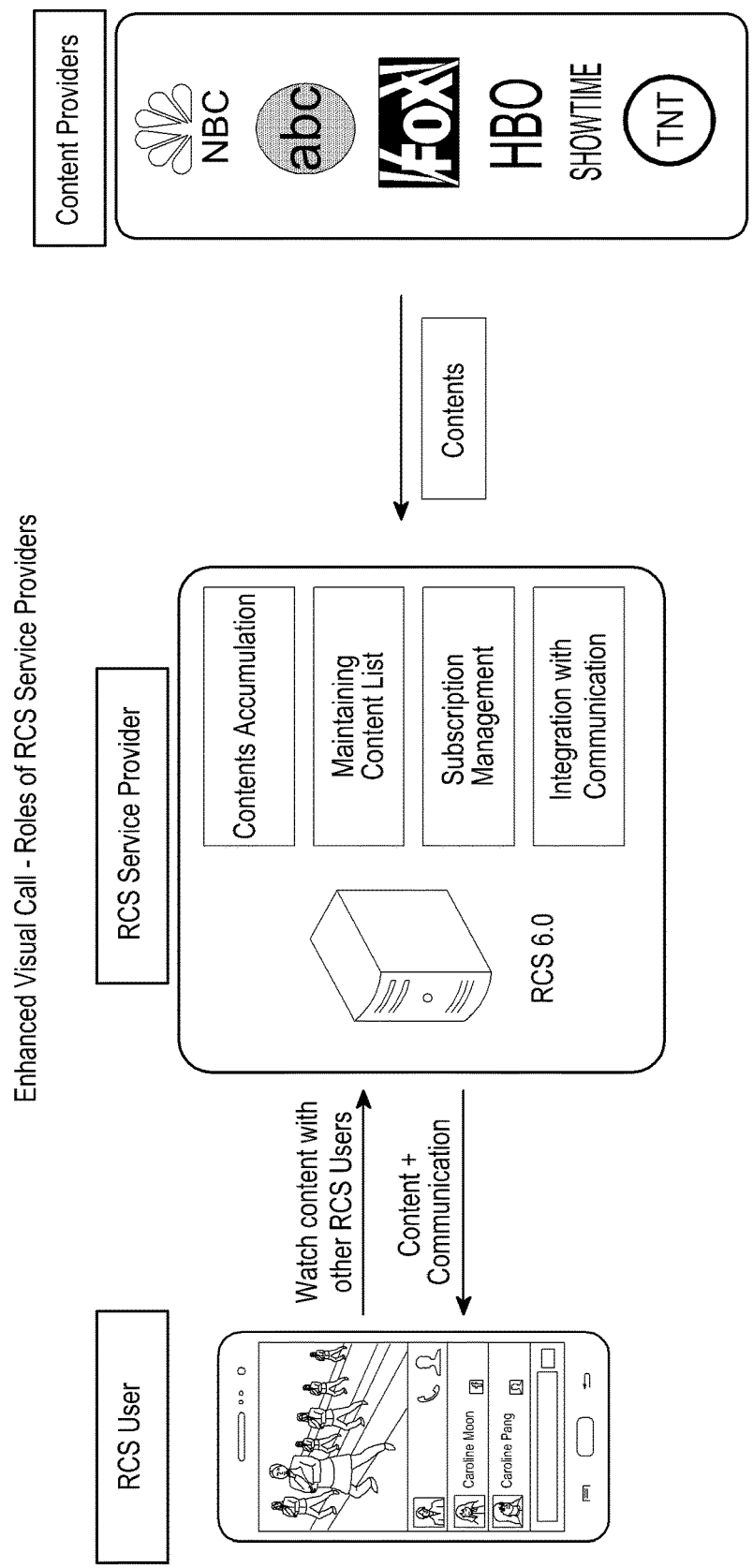
FIG. 5F shows an RCS service provider's role of a visual chat according to an embodiment of the present disclosure.

FIG. 5F shows an RCS service provider's role of a visual chat according to an embodiment of the present disclosure.

FIG. 5G shows expected benefits of a visual chat according to an embodiment of the present disclosure.

FIG. 6A shows features of a converged address book according to an embodiment of the present disclosure.

Figure 6B:
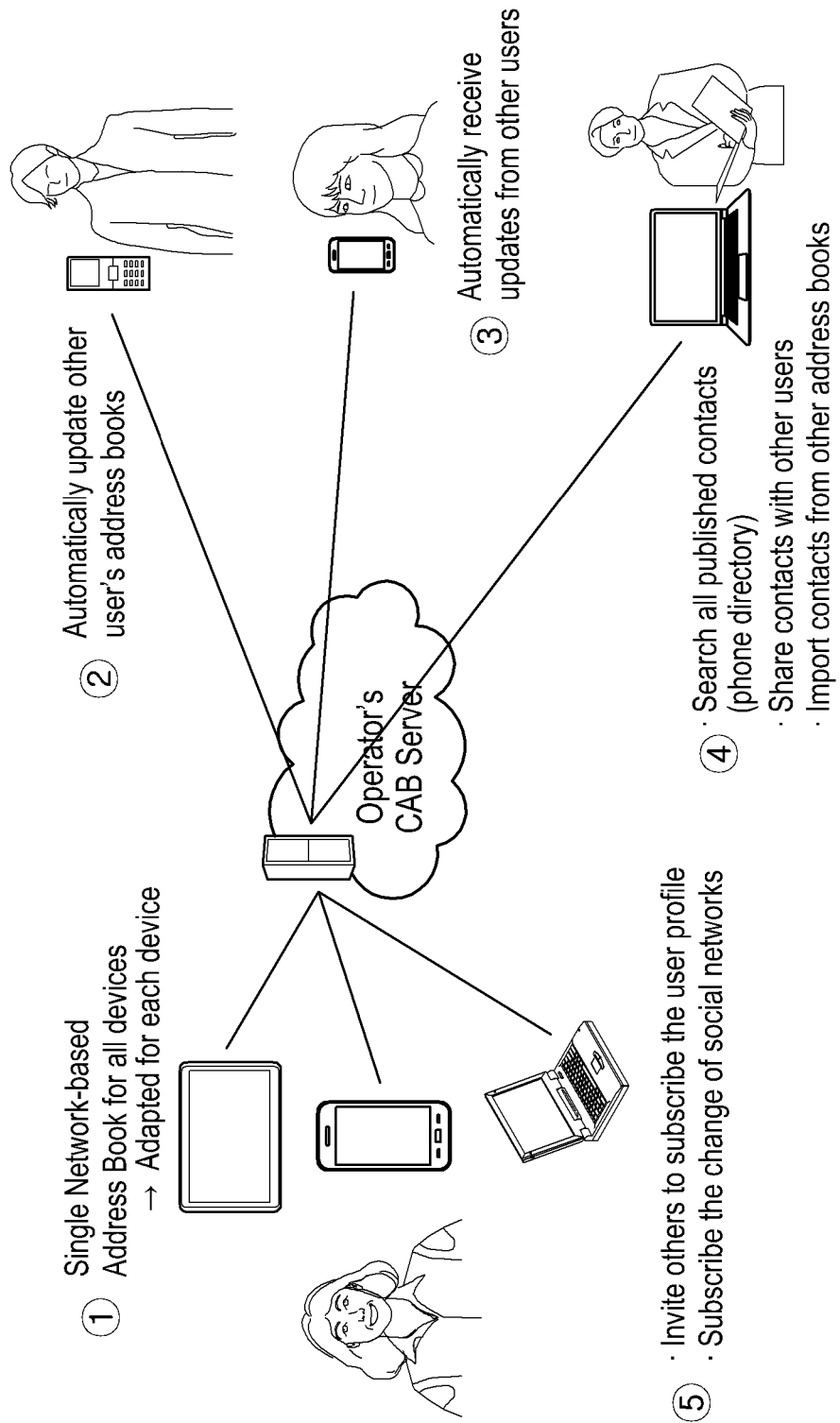
FIG. 6B shows an overview of a converged address book according to an embodiment of the present disclosure.

FIG. 6B shows an overview of a converged address book according to an embodiment of the present disclosure.

Figure 6C:
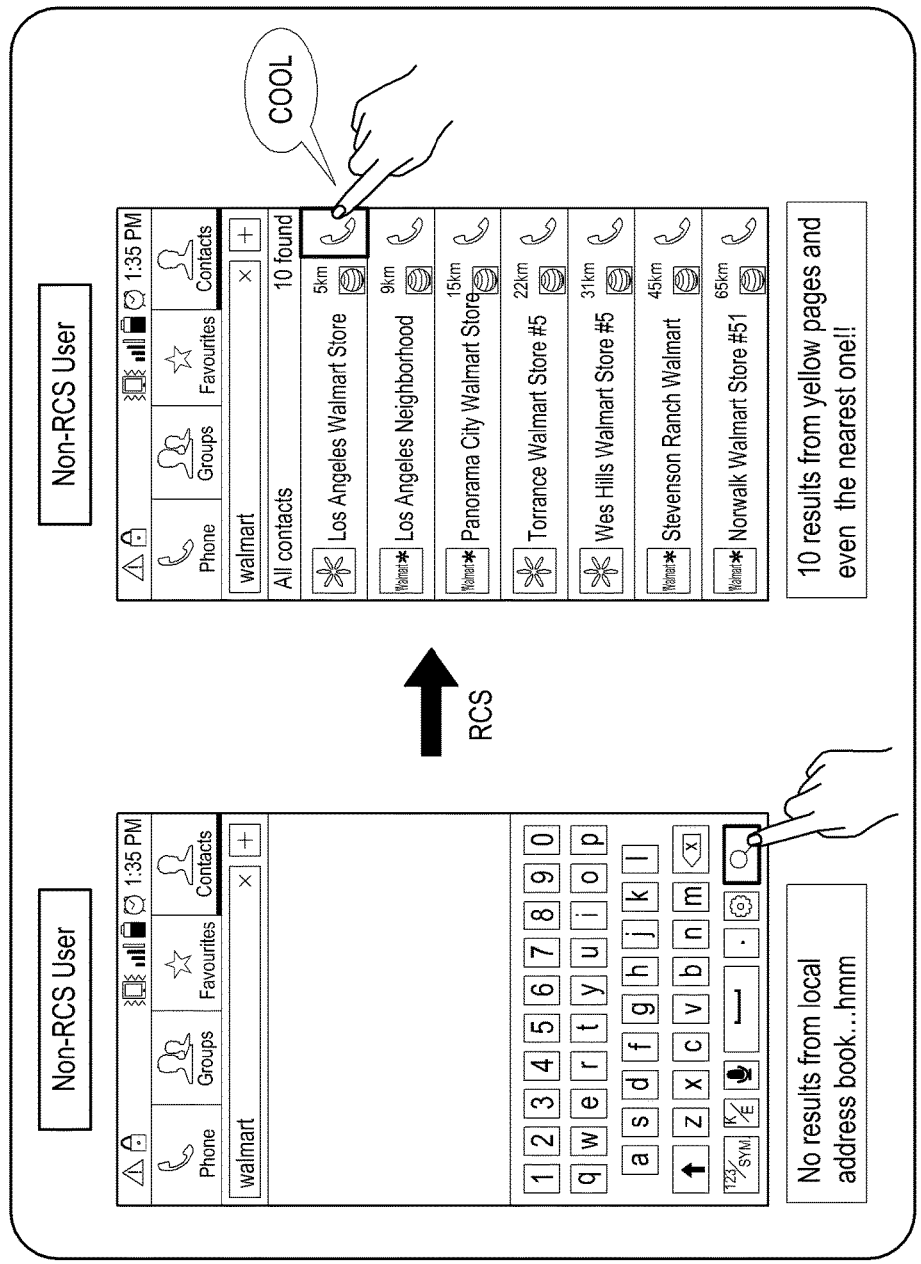
FIG. 6C shows a contact search use case of a converged address book according to an embodiment of the present disclosure.

FIG. 6C shows a contact search use case of a converged address book according to an embodiment of the present disclosure.

Figure 6D:
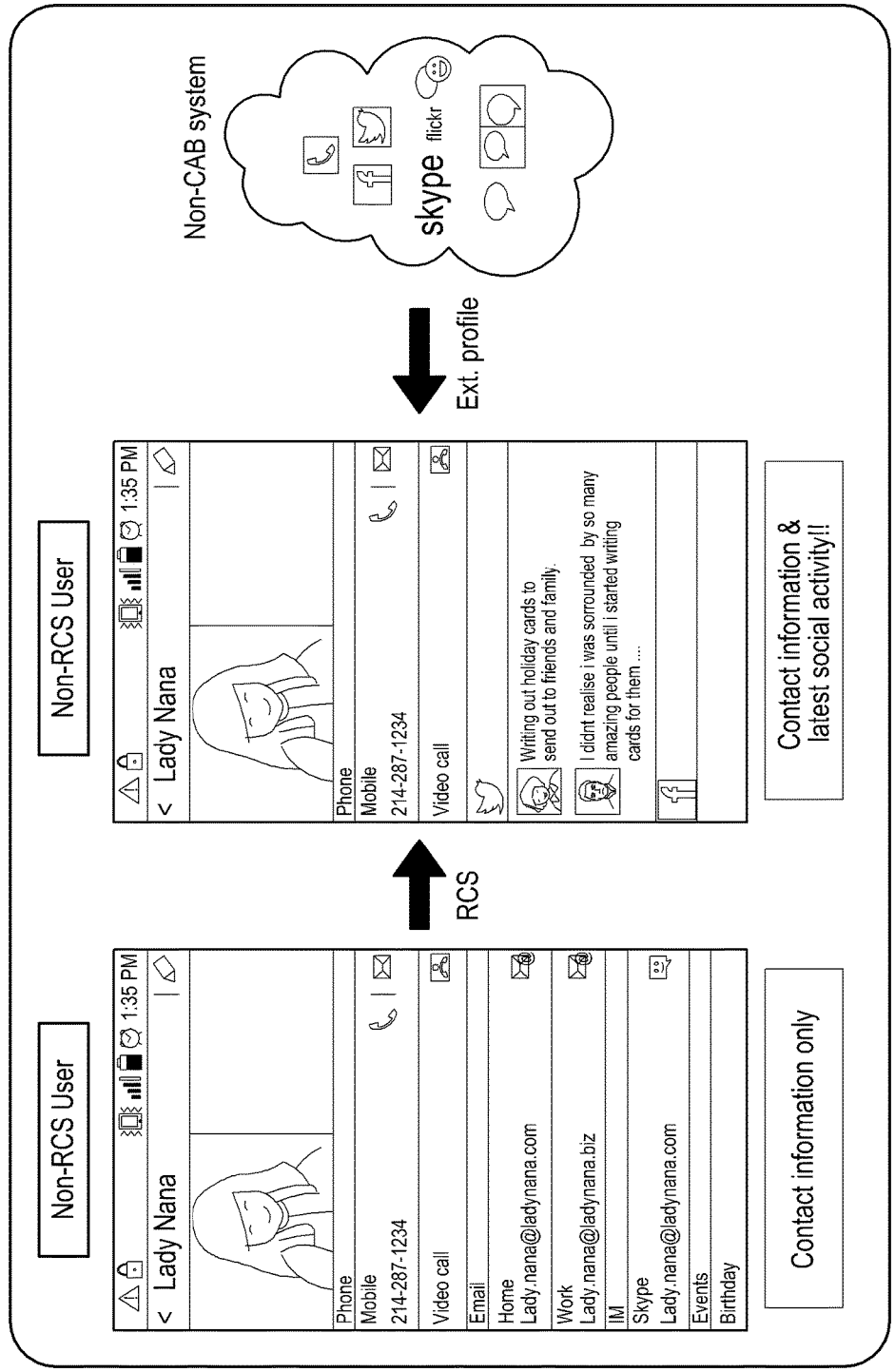
FIG. 6D shows an external profile import use case of a converged address book according to an embodiment of the present disclosure.

FIG. 6D shows an external profile import use case of a converged address book according to an embodiment of the present disclosure.

Figure 6E:
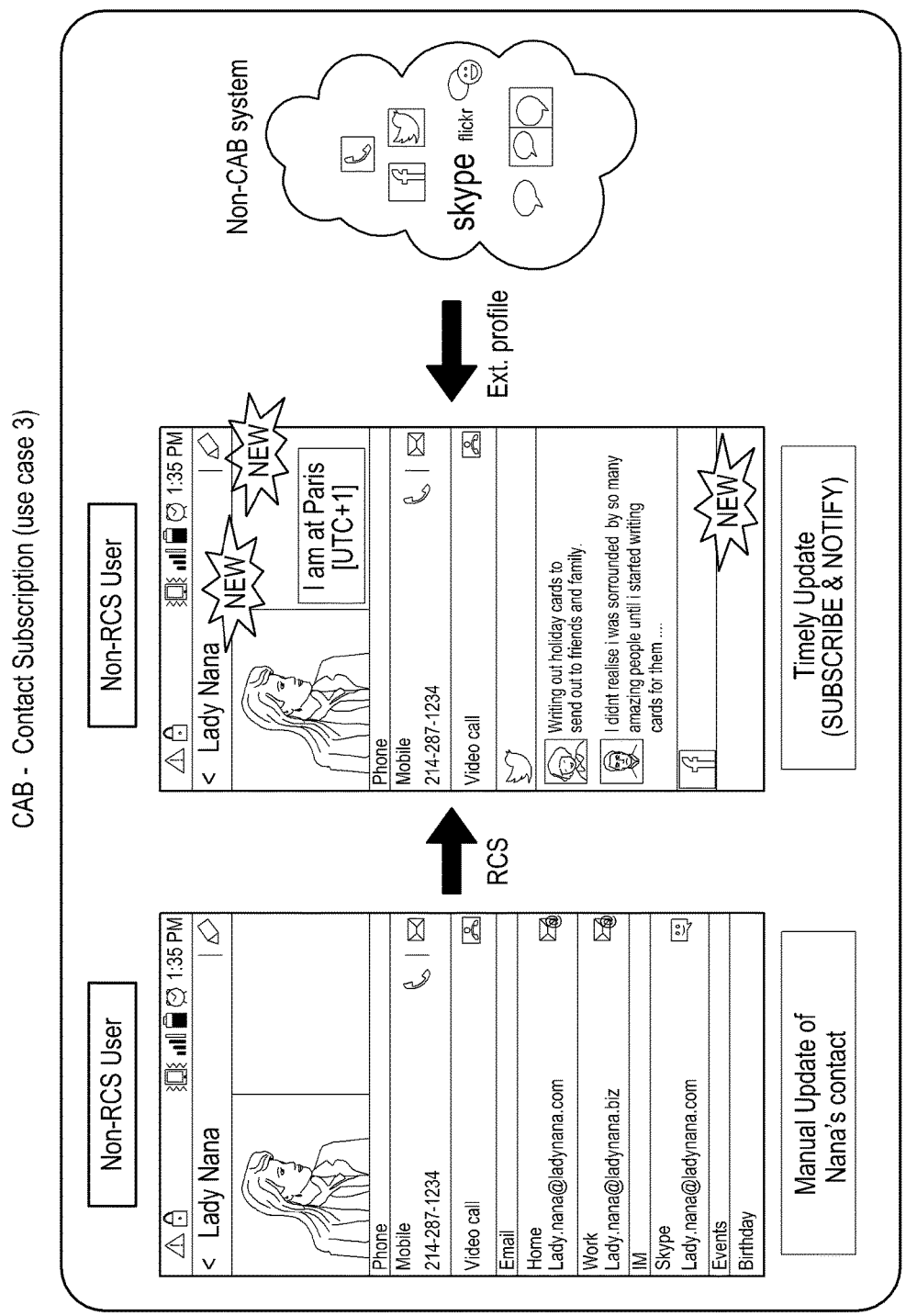
FIG. 6E shows a contact subscription use case of a converged address book according to an embodiment of the present disclosure.

FIG. 6E shows a contact subscription use case of a converged address book according to an embodiment of the present disclosure.

Figure 6F:
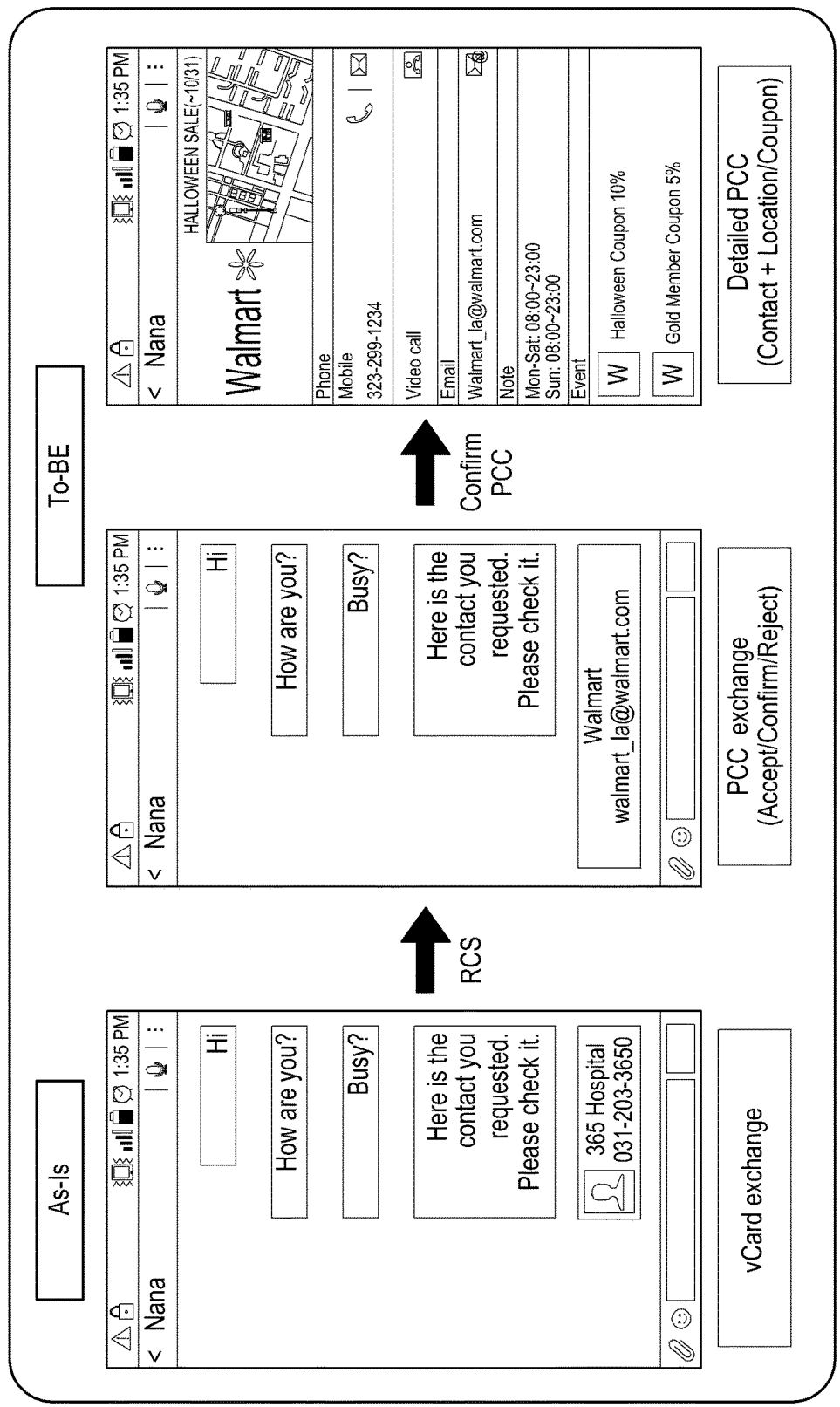
FIG. 6F shows a contact share use case of a converged address book according to an embodiment of the present disclosure.

FIG. 6F shows a contact share use case of a converged address book according to an embodiment of the present disclosure.

Figure 6G:
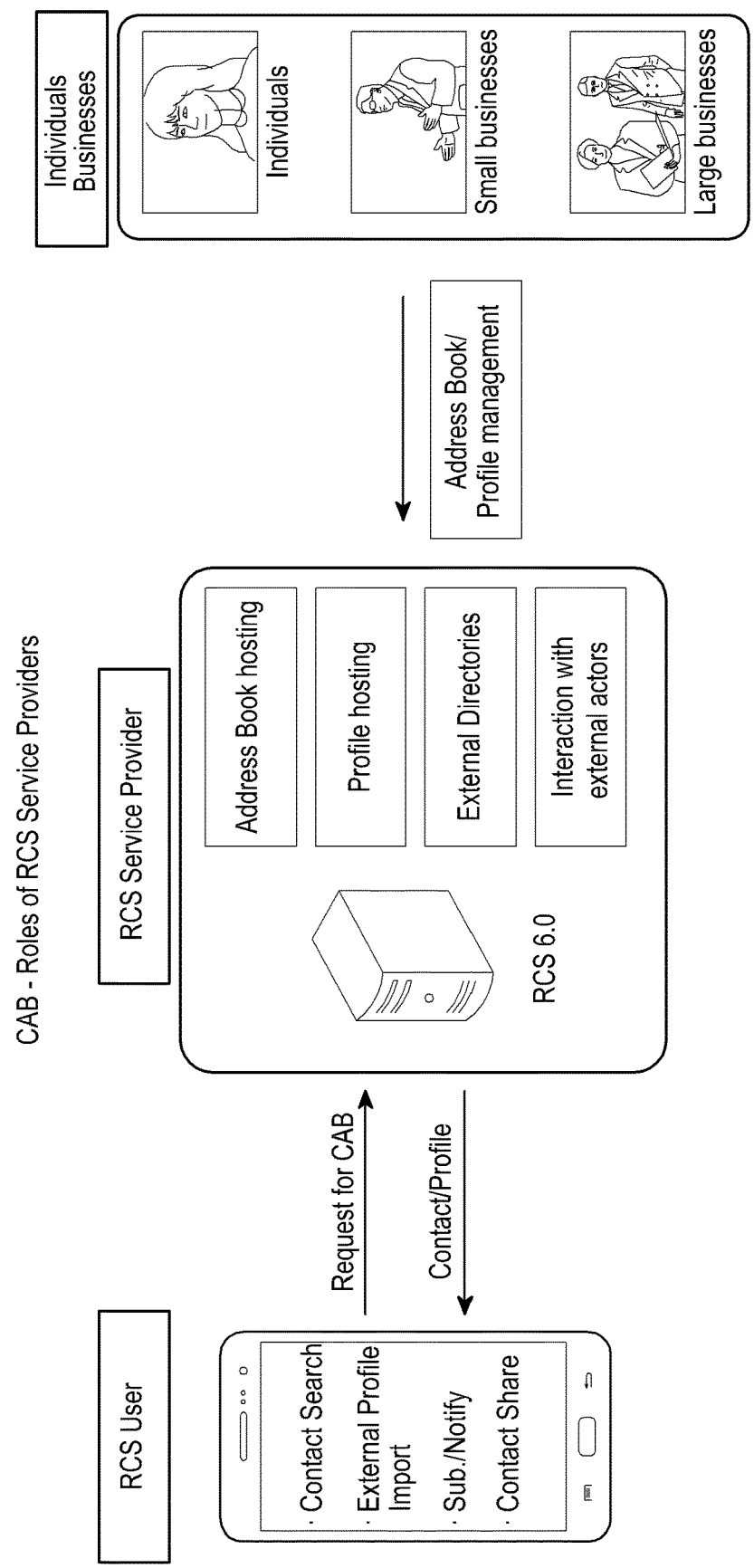
FIG. 6G shows an RCS service provider's role of a converged address book according to an embodiment of the present disclosure.

FIG. 6G shows an RCS service provider's role of a converged address book according to an embodiment of the present disclosure.

FIG. 6H shows expected benefits of a converged address book according to an embodiment of the present disclosure.

Figure 6I:
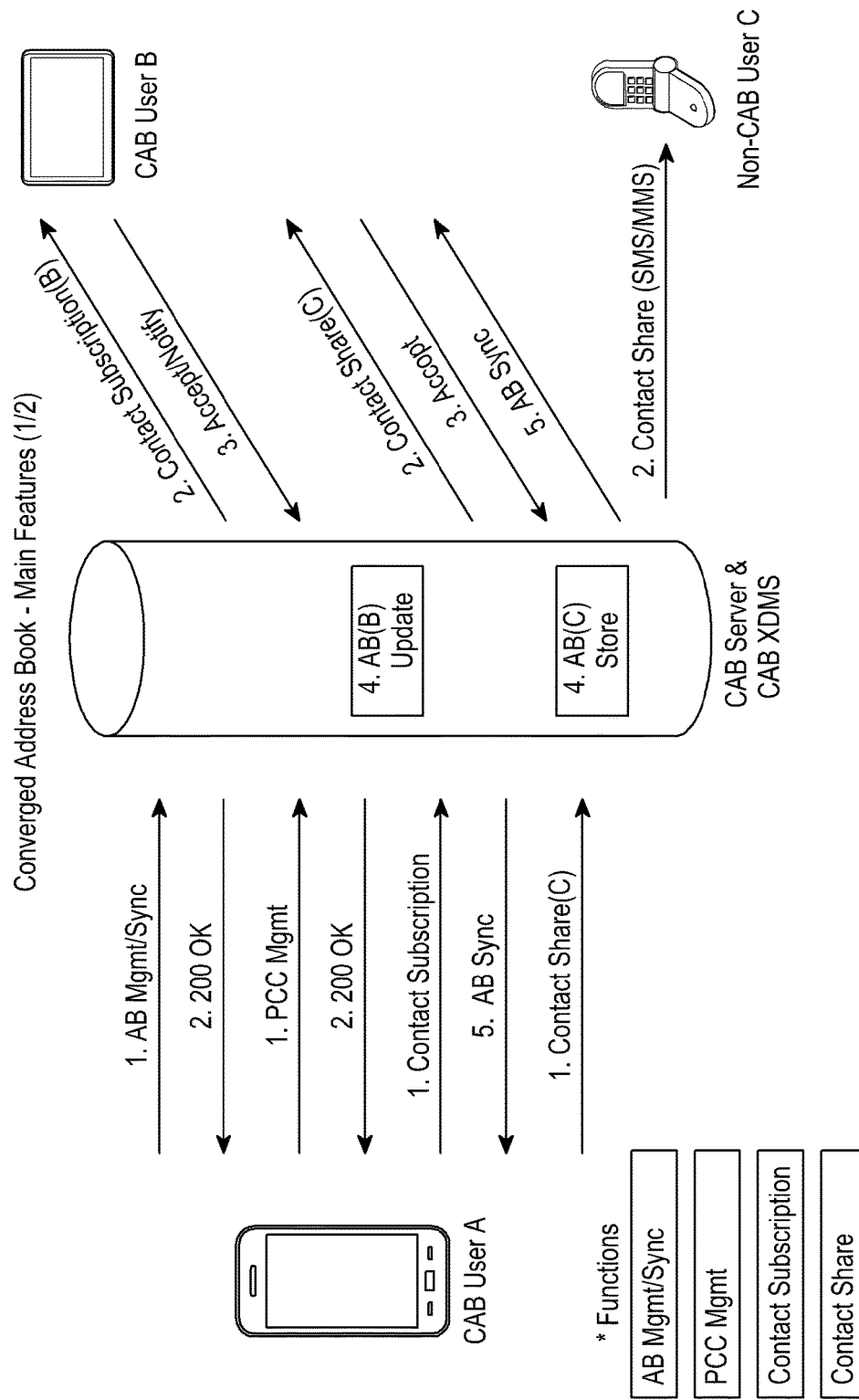
FIG. 6I shows features of a converged address book according to an embodiment of the present disclosure.

FIG. 6I shows features of a converged address book according to an embodiment of the present disclosure.

Figure 6J:
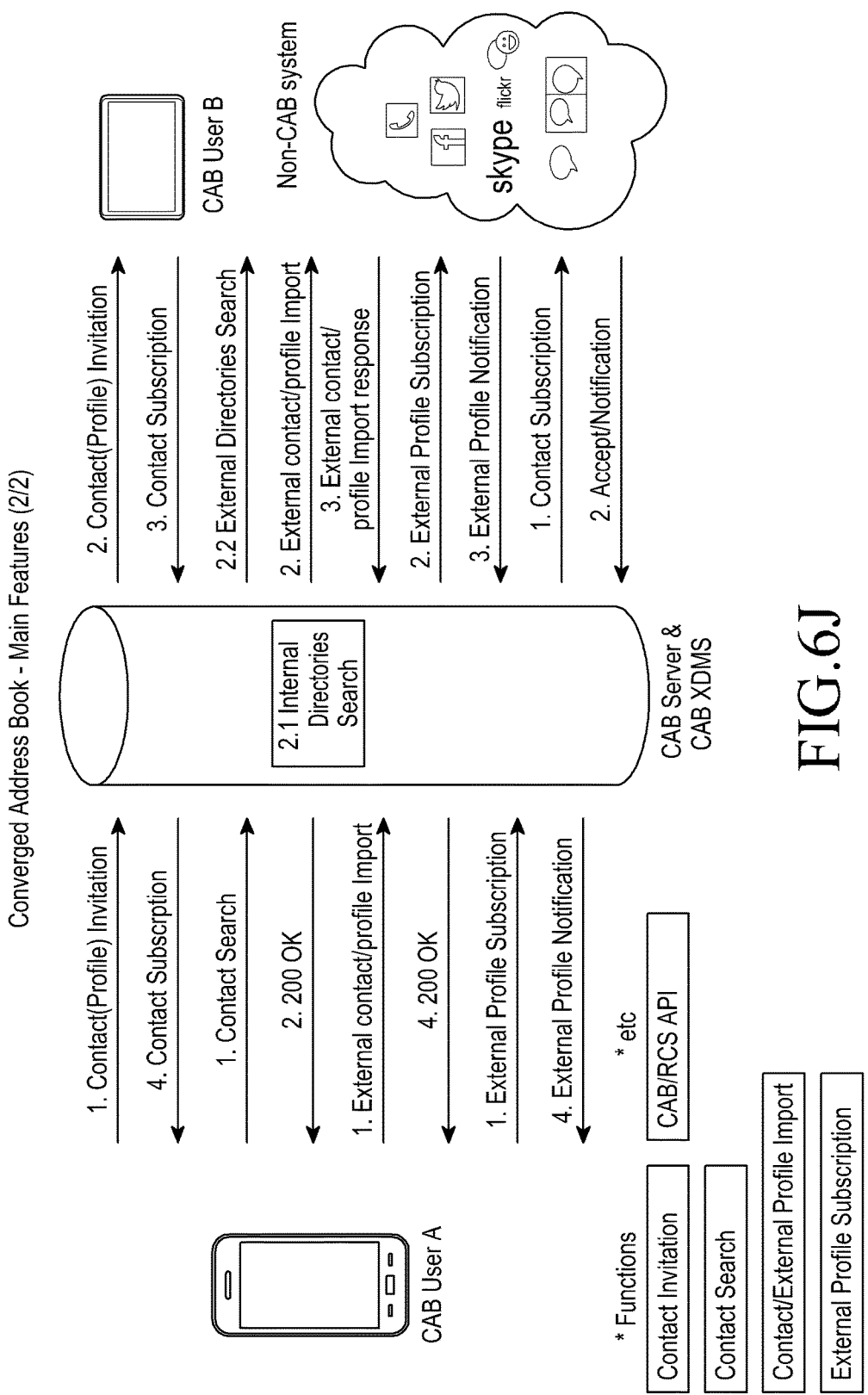
FIG. 6J shows features of a converged address book according to an embodiment of the present disclosure.

FIG. 6J shows features of a converged address book according to an embodiment of the present disclosure.

Figure 7:
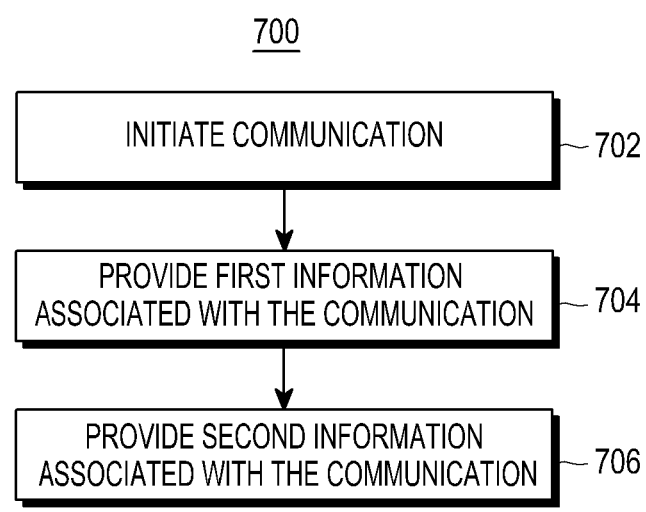
FIG. 7 shows a flowchart according an embodiment of the present disclosure.

FIG. 7 shows a flowchart according to an embodiment of the present disclosure.

Referring to FIG. 7, a set of operations 700 may be performed, for example, by the electronic device 102, as illustrated in FIG. 1. At operation 702, communication may be initiated. The communication may be, for example, a voice call or data communication (e.g., Internet search query, downloading data, etc.). At operation 704, first information associated with the communication may be provided. For example, audio information received during a voice call may be provided to a user as the first information. At operation 706, second information associated with the communication may be provided. The second information may be provided in a mode different from the first information. For example, as in the example above, if the first information is provided aurally (e.g., audio information), the second information may be provided visually (e.g., text or graphic information) or vice versa.

The first and/or second information may be received from an external electronic device such as, for example, a server in communication with the electronic device that initiated the communication. For example, when the user initiates communication using his/her electronic device with another entity, the other entity may instruct the server to send information related to the communication to the user's electronic device. In an example, the information received from the server may be provided to the user in an interactive format.

The above-described operations may be provided in series, in parallel, or in any order. Not all operations (e.g., operations 702, 704, and 706) need to be performed, and additional operations may also be performed.

Figure 8:
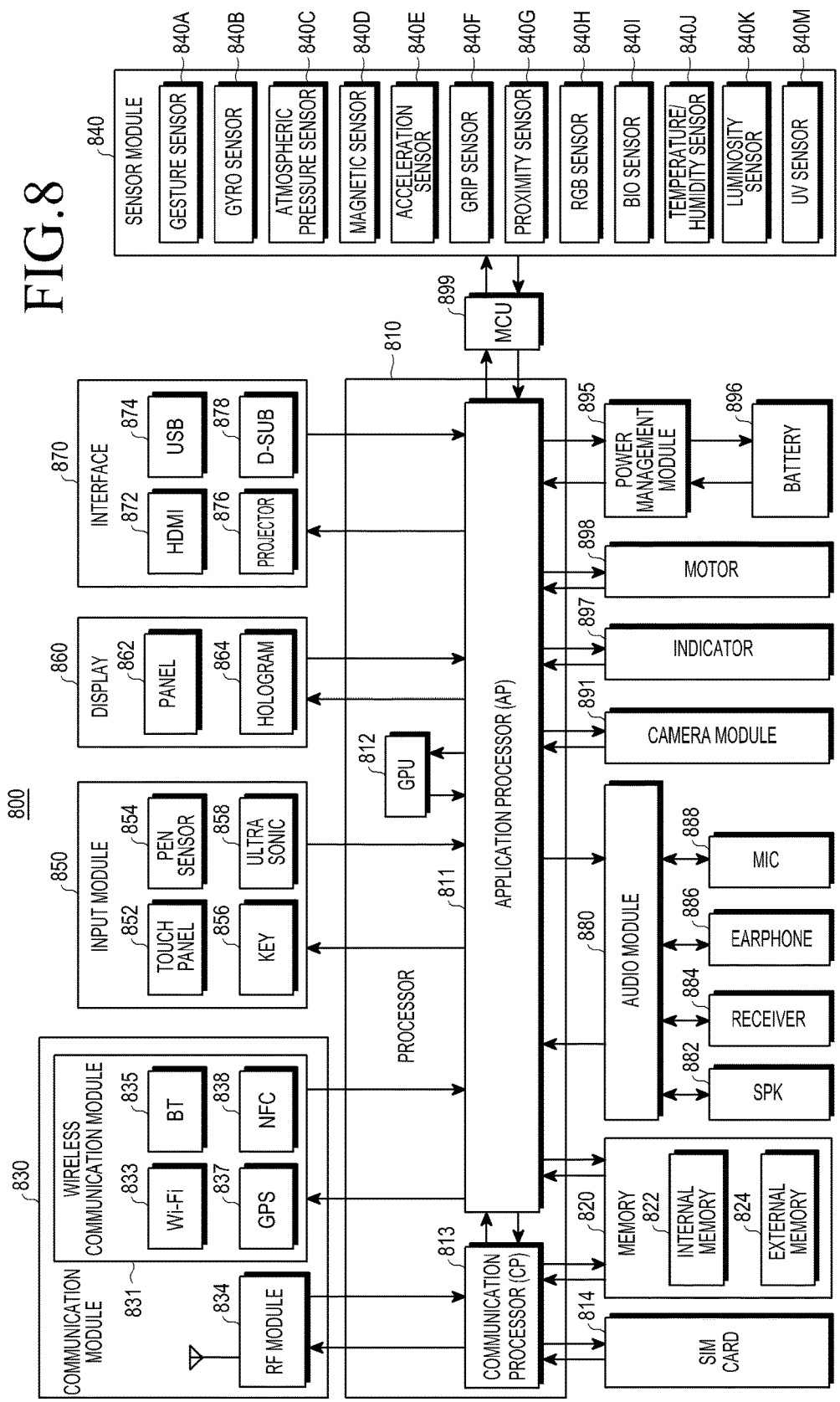
FIG. 8 shows a block diagram of an electronic device according to an embodiment of the present disclosure.

FIG. 8 shows a block diagram of an electronic device according to an embodiment of the present disclosure. The electronic device may be, for example, the electronic device 201, as illustrated in FIG. 2.

Referring to FIG. 8, an electronic device 800 may include at least one of a processor 810, a subscriber identification module (SIM) card 814, a memory 820, a communication module 830, a sensor module 840, an input module 850, a display module 860, an interface 870, an audio module 880, a camera module 891, a power management module 895, a battery 896, an indicator 897 and a motor 898.

The processor 810 (e.g., processor 220, as illustrated in FIG. 2) may include one or more application processors (APs) 811 or one or more communication processors (CPs) 813. Although FIG. 8 shows that the AP 811 and the CP 813 are included in the processor 810, the AP 811 and the CP 813 may each be included in different integrated circuit (IC) packages.

The AP 811 may control one or more hardware or software components that are connected to the AP 811 or perform processing or computation of data (including multimedia data), by executing an operating system (OS) or an application program (app). The AP 811 may be implemented, for example, as a system-on-chip (SoC). The processor 810 may further include a graphics processing unit (GPU 812). The processor 810 may include any combination of the AP 811, the CP 813 or the GPU 812.

The CP 813 may manage data link associated with communication between an electronic device (e.g., electronic device 201) and one or more other electronic devices, and alter communication protocol. The CP 813 may be implemented, for example, as a SoC. According to an embodiment, the CP 813 may perform at least a portion of multimedia control functionality. The CP 813 may, for example, identify and authenticate an electronic device within a communication network, using a SIM (e.g., SIM card 814). The CP 813 may also provide the user with, for example, voice call, video call, text messaging (e.g., short messaging service (SMS)), or packet data services.

According to an embodiment, the AP 811 or the CP 813 may process instructions or data received from non-volatile memory by loading the instructions or data into volatile memory. Also, the AP 811 or the CP 813 may store into the non-volatile memory data received from, or generated by, at least one of other components.

The SIM card 814 may be a card implementing a SIM, and may be configured to be inserted into a slot disposed at a specified location of the electronic device. The SIM card 814 may include a unique identifier (e.g., integrated circuit card identifier (ICCID)) or subscriber information (e.g., international mobile subscriber identity (IMSI)) for identifying the electronic device 800 or a user thereof.

The memory 820 may include internal memory 820 or external memory 824. The memory 820 may be, for example, the memory 230, as illustrated in FIG. 2. The internal memory 822 may be, for example, at least one of volatile memory (e.g., dynamic random access memory (DRAM), static RAM (SRAM) or synchronous dynamic RAM (SDRAM)) or non-volatile memory (e.g., one time programmable ROM (OTPROM), programmable ROM (PROM), erasable and programmable ROM (EPROM), electrically erasable and programmable ROM (EEPROM), mask ROM, flash ROM, NAND flash memory or NOR flash memory). According to an embodiment, the internal memory 822 may be a solid state drive (SSD). The external memory 824 may be, for example, a flash drive (e.g., Compact Flash (CF), secure digital (SD), micro Secure Digital (micro-SD), mini Secure Digital (mini-SD) extreme Digital (xD) or Memory Stick).

The communication module 830 may include at least one of a wireless communication module 831 and radio frequency (RF) module 834. The communication module 830 may be, for example, the communication module 260, as illustrated in FIG. 2. The wireless communication module 831 may include, for example, a Wi-Fi module 833, a Bluetooth (BT) module 835, a GPS module 837 or near-field communication (NFC) module 838. For example, the wireless communication module 831 may provide wireless communication functionality using radio waves having various frequencies. Additionally or alternatively, the wireless communication module 831 may include an interface (e.g., a LAN card) or a modem for connecting the electronic device 800 to one or more networks such as, for example, Internet, LAN, WAN, telecommunication network, cellular network, satellite network or POTS.

The RF module 834 may data transmission and reception functionalities such as, for example, transmitting and receiving RF signals or requested electronic signals. The RF module 834 may include at least one of a transceiver, a power amp module (PAM), a frequency filter and a low noise amplifier (LNA). Also, the RF module 834 may include one or more components for transmitting and receiving electro-magnetic (EM) waves in the free space such as, for example, conductors or conductive wires.

The sensor module 840 may include at least one of, for example, a gesture sensor 840A, a gyro sensor 840B, an atmospheric pressure sensor 840C, a magnetic sensor 840D, an accelerometer 840E, a grip sensor 840F, a proximity sensor 840G, a red-blue-green (RGB) sensor 840H, a biometric sensor 840I, a temperature/humidity sensor 840J, a luminosity sensor 840K or an ultra violet (UV) sensor 840M. The sensor module 840 may detect the operation state of the electronic device or measure physical properties and convert the detected or measured information into electrical signals. Additionally or alternatively, the sensor module 840 may also include, for example, electrical-nose sensor, electromyography (EMG) sensor, electroencephalogram (EEG) sensor, or fingerprint sensor. The sensor module 840 may also include control circuitry for controlling one or more sensors included therein.

The input module 850 may include at least one of a touch panel 852, a (digital) pen sensor 854, a key 856 and an ultrasonic input device 858. The input module 850 may be, for example, the input module 240, as illustrated in FIG. 2. The touch panel 852 may detect touch input using, for example, capacitive, resistive, infrared or ultrasonic methods. The touch panel 852 may also include a touch panel controller. A capacitive-type touch panel may, for example, detect proximity inputs (e.g. hovering input) in addition to, or alternative to, touch inputs. The touch panel 852 may also include a tactile layer. Haptic feedback may be provided to the user using the tactile layer.

The (digital) pen sensor 854 may be implemented, for example, using methods identical to or similar to receiving a touch input from a user, or using a separate detection sheet (e.g., a digitizer). The key 856 may be, for example, a keypad or a touch key. The ultrasonic input device 858 may be a device configured to identify data by detecting, using a microphone (e.g., microphone (mic) 888), ultrasonic signals generated by a pen. The ultrasonic input device 858 may detect data wirelessly. According to an embodiment, the electronic device 800 may receive user input from an external device (e.g., a network, computer or server) connected to the electronic device 800 using the communication module 830.

The display module 860 may include a panel 862 or a hologram 864. The display module 860 may be, for example, the display module 250, as illustrated in FIG. 2. The panel 862 may be, for example, a liquid-crystal display (LCD) or an active-matrix organic light-emitting diode (AM-OLED) display. The panel 862 may be configured to be, for example, flexible, transparent or wearable. The panel 862 and the touch panel 852 may be implemented as a single module. The hologram 864 may utilize the interference of light waves to provide a three-dimensional image in empty space. According to an embodiment, the display module 860 may also include a control circuitry for controlling the panel 862 or the hologram 864.

The interface 870 may include, for example, one or more interfaces for a high-definition multimedia interface (HDMI) 872, a universal serial bus (USB) 874, a projector 876 or a d-subminiature (D-sub) 878. Additionally or alternatively, the interface 870 may include, for example, one or more interfaces for secure digital (SD)/multimedia card (MMC) or infrared data association (IrDA).

The audio module 880 may encode/decode voice into an electrical signal, and vice versa. The audio module 880 may, for example, encode/decode voice information input into, or output from, a speaker (SPK) 882, a receiver 884, an earphone 886 or the microphone (MIC) 888.

The camera module 891 may capture still images or video. According to an embodiment, the camera module 891 may include one or more image sensors (e.g., front sensor module or rear sensor module), an image signal processor (ISP), or a flash light-emitting diode (flash LED).

The power management module 895 may manage electrical power of the electronic device 800. The power management module 895 may include, for example, a power management integrated circuit (PMIC), a charger integrated circuit (charger IC) or a battery fuel gauge.

The PMIC, for example, may be disposed in an integrated circuit or a system-on-chip (SoC) semiconductor. The charging method for the electronic device 800 may include wired or wireless charging. The charger IC may charge a battery, or prevent excessive voltage or excessive current from a charger from entering the electronic device 800. According to an embodiment, the charger IC may include at least one of a wired charger IC or a wireless charger IC. The wireless charger IC may be, for example, a magnetic resonance type, a magnetic induction type or an electromagnetic wave type, and may include circuits such as, for example, a coil loop, a resonance circuit or a rectifier.

The battery gauge may measure, for example, a charge level, a voltage while charging, or a temperature of the battery 896. The battery 896 may supply power to, for example, the electronic device 800. The battery 896 may be, for example, a rechargeable battery.

The indicator 897 may indicate one or more states (e.g., boot status, message status or charge status) of the electronic device 800 or a portion thereof (e.g., the AP 811). The motor 898 may convert an electrical signal into a mechanical vibration. A module control unit (MCU) 899 may control the sensor module 840.

The electronic device 800 may include one or more devices e.g., the GPU 812 for supporting a mobile television (mobile TV). The devices for supporting mobile TV support processing of media data compliant with, for example, digital multimedia broadcasting (DMB), digital video broadcasting (DVB) or media flow.

Various embodiments of the present disclosure may include a method comprising: initiating communication at an electronic device; providing, at the electronic device, first information associated with the communication; and providing, at the electronic device, second information associated with the communication, the second information provided in a mode different from the first information. In the method, the initiating communication may comprise initiating a voice call. Alternatively, in the method, the initiating communication may comprise sending a search query on the Internet. Selectively, in the method, the providing the first information may comprise providing audio content associated with the communication to a user. Selectively, in the method, the providing the second information may comprise providing visual content associated with the communication to a user. Selectively, the visual content is interactive. Selectively, in the method, the providing the second information may comprise receiving the second information from another electronic device. Selectively, the other electronic device may comprise a server associated with a participant to the communication. Alternatively, in the method, the initiating communication may comprise determining a participant to the communication, and at least one of the first information or the second information is associated with the participant. Alternatively, in the method, the initiating communication may comprise initiating the communication based on user input responsive to at least one of the first information or the second information. Selectively, in the method, the providing the second information may comprise providing information obtained from a participant to the communication.

Various embodiments of the present disclosure may include an apparatus, comprising: an initiating module configured to initiate communication at an electronic device; and a providing module configured to provide first information associated with the communication and provide second information associated with the communication, the providing module being configured to provide the second information in a mode different from the first information. Selectively, the initiating module is configured to initiate a voice call. Selectively, the initiating module is configured to: send a search query on the Internet. Selectively, the providing module is configured to: provide, as the first information, audio content associated with the communication to a user. Selectively, wherein the providing module is configured to: provide, as the second information, visual content associated with the communication to a user. Selectively, the visual content is interactive. Selectively, the providing module is configured to: receive the second information from another electronic device. Selectively, the other electronic device comprises a server associated with a participant to the communication. Selectively, the initiating module is configured to determine a participant to the communication, and at least one of the first information or the second information is associated with the participant. Selectively, the initiating module is configured to: initiate the communication based on user input responsive to at least one of the first information or the second information. Selectively, the providing module is configured to: provide, as the second information, information obtained from a participant to the communication.

Various embodiments of the present disclosure may include a non-transitory computer-readable medium storing instructions that when executed by one or more processors cause the one or more processors to perform operations comprising: initiating communication at an electronic device; providing, at the electronic device, first information associated with the communication; and providing, at the electronic device, second information associated with the communication, the second information provided in a mode different from the first information. Selectively, the initiating may comprise initiating a voice call. Selectively, the initiating may comprise sending a search query on the Internet. Selectively, the providing the first information may comprise providing audio content associated with the communication to a user. Selectively, the providing the second information may comprise providing visual content associated with the communication to a user. Selectively, the visual content is interactive. Selectively, the providing the second information may comprise receiving the second information from another electronic device. Selectively, the other electronic device may comprise a server associated with a participant to the communication. Selectively, the initiating may comprise determining a participant to the communication, and at least one of the first information or the second information is associated with the participant. Selectively, the initiating may comprise initiating the communication based on user input responsive to at least one of the first information or the second information. Selectively, the providing the second information may comprise providing information obtained from a participant to the communication.

Figure 9:
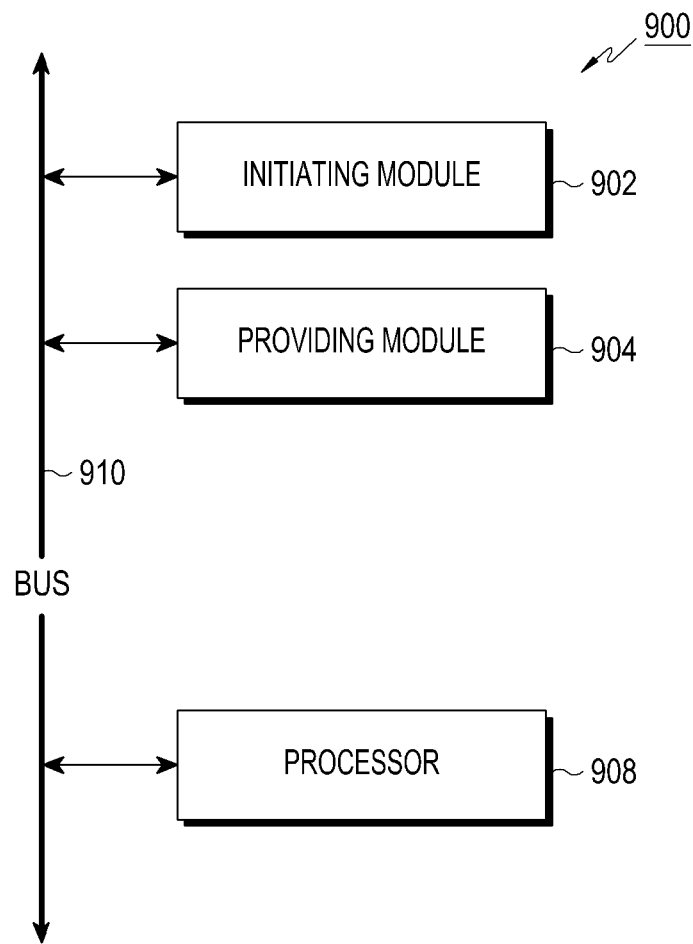
FIG. 9 shows a block diagram of an electronic device according an embodiment of the present disclosure.

FIG. 9 shows a block diagram of an electronic device according an embodiment of the present disclosure.

Referring to FIG. 9, an electronic device 900 may be, for example, the electronic device 102, as illustrated in FIG. 1. The electronic device 900 may include an initiating module 902, a providing module 904, a processor 908 and a bus 910. The modules 902 and 904 and the processor 908 may be coupled with each other via the bus 910. The processor 908 may be, for example, the processor 220, as illustrated in FIG. 2. Although FIG. 9 shows that the modules 902 and 904 are coupled with a single processor, modules of the electronic device 900 may be coupled with one or more processors, or some or all modules may incorporate one or more processors within respective modules.

The initiating module 902 may be configured to initiate communication at an electronic device. The communication may include, for example, a voice call, Internet search query, or other types of voice and/or data communication.

The providing module 904 may be configured to provide first information and second information that are associated with the communication. The first information may be, for example, audio signal provided to a user through a speaker. The second information may be, for example, visual information provided to the user through a display (e.g., a touch screen).

Components of hardware described above according to the present disclosure may each include one or more components, and each component's name may vary according to the type of an electronic device. The hardware according to the present disclosure may include at least one of the above-described components, and some may be omitted or may include additional components. Also, some of the components of the hardware according to the present disclosure may be combined into a single entity and perform functions identical or similar to those of the respective components before their combination.

The term "module" as used herein may include its ordinary meaning including, but not limited to, for example, a unit of one, or a combination of two or more, hardware, software or firmware. The term "module" may be used interchangeably with terms such as, for example, unit, logic, logical block, component or circuit. A module may be the smallest unit for performing one or more functions, or a portion thereof. A module may be implemented mechanically, or electronically. For example, a module according to the present disclosure may include at least one of a known, or to-be-developed, application-specific integrated circuit (ASIC) chip, field-programmable gate array (FPGA) or programmable logic device that perform certain operations.

A module according to the present disclosure may include one or more of the above-described components, may omit a portion thereof, or may include additional components. Operations that are performed by a module, a programming module or other components according to the present disclosure may be processed in a serial, parallel, repetitive or heuristic manner, and some operations may be omitted or additional operations may be added.

Various embodiments of the present disclosure may be implemented as a set of program instructions that may be performed by a computer (e.g., executing by processor), and may be recorded in a computer-readable medium. The computer-readable medium may record, for example, program instructions, data files or data structures, either individually or as a combination. The program instructions that are recorded on the computer-readable medium may be specifically created implemented for the present disclosure, or may be well known to a person having ordinary skill in the art.

The non-transitory computer-readable medium may include hardware devices, for example, magnetic media such as hard disk drive, floppy disk, or tape, optical media such as compact disc read-only memory (CD-ROM) or digital versatile disc (DVD), magneto-optical media such as floptical disk, read-only memory (ROM), RAM or flash memory, that are configured to store program instructions. Program instructions may include machine language code that are produced by a compiler or high-level language code that may be executed by a computer using an interpreter. The functionalities of hardware discussed above may be implemented as one or more software modules, and vice versa.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for a communication service by a user device in a wireless communication system, the method comprising:
    initiating a call communication with a communication device;
    displaying first information, which is related to a voice communication with the communication device, at a first location in a display of the user device, while calling the communication device to establish the call communication or while the call communication is established;
    receiving, from a server, second information on a service to which the communication device subscribes for providing the user device with the service; and
    displaying second information at a second location, which is different from the first location, in the display of the user device, while calling the communication device to establish the call communication or while the call communication is established,
    wherein the first information and the second information are displayed on the display concurrently, and
    wherein the second information comprises information related to a social network service (SNS) activity of a user of the communication device.

2. The method of claim 1, wherein the initiating of the call communication comprises sending a search query on an internet.

3. The method of claim 1, wherein the first information comprises at least one of a name of the communication device, a contact of the communication device, a profile of the communication device, a service capability of the communication device, status information of the communication device, and an item being capable to serve by the server.

4. The method of claim 1, further comprising:
    performing the call communication with the communication device based on a user input responsive to at least one of the first information and the second information.

5. A user device for a communication service in a wireless communication system, the user device comprising:
    a storage having instructions stored therein;
    a transceiver; and
    a processor,
    wherein upon execution of the instructions, the processor is configured to:
        initiate a call communication with a communication device,
        display first information, which is related to a voice communication with the communication device, at a first location in a display of the user device, while calling the communication device to establish the call communication or while the call communication is established,
        receive, from a server, second information on a service to which the communication device subscribes for providing the user device with the service, and
        display second information at a second location, which is different from the first location, in the display of the user device, while calling the communication device to establish the call communication or while the call communication is established, and wherein the first information and the second information are displayed on the display concurrently, and wherein the second information comprises information related to a social network service (SNS) activity of a user of the communication device.

6. The user device of claim 5, wherein the processor is further configured to initiate the call communication by sending a search query on an internet.

7. The user device of claim 5, wherein the first information comprises at least one of a name of the communication device, a contact of the communication device, a profile of the communication device, a service capability of the communication device, status information of the communication device, and an item being capable to serve by the server.

8. The user device of claim 5, wherein the processor is further configured to perform the call communication with the communication device based on a user input responsive to at least one of the first information and the second information.

9. A non-transitory computer-readable recording medium having an executable program recorded thereon, wherein the program instructs a computer to perform:

initiating a call communication with a communication device;

displaying first information, which is related to a voice communication with the communication device, at a first location in a display of the user device, while calling the communication device to establish the call communication or while the call communication is established;

receiving, from a server, second information on a service to which the communication device subscribes for providing the user device with the service; and displaying second information at a second location, which is different from the first location, in the display of the user device, while calling the communication device to establish the call communication or while the call communication is established, wherein the first information and the second information are displayed on the display concurrently, and wherein the second information comprises information related to a social network service (SNS) activity of a user of the communication device.

10. The non-transitory computer-readable recording medium of claim 9, wherein the initiating of the call communication comprises sending a search query on an internet.

11. The non-transitory computer-readable recording medium of claim 9, wherein the first information comprises at least one of a name of the communication device, a contact of the communication device, a profile of the communication device, a service capability of the communication device, status information of the communication device, and an item being capable to serve by the server.

12. The non-transitory computer-readable recording medium of claim 9, further comprising performing the call communication with the communication device based on a user input responsive to at least one of the first information and the second information.

\* \* \* \* \*